(12) United States Patent
Lawrence et al.

(10) Patent No.: US 8,808,944 B2
(45) Date of Patent: *Aug. 19, 2014

(54) METHOD FOR STORING HOLOGRAPHIC DATA

(75) Inventors: Brian Lee Lawrence, Niskayuna, NY (US); Marc Dubois, Keller, TX (US); Eugene Pauling Boden, Scotia, NY (US); William David Richards, Scotia, NY (US); Patrick Joseph McCloskey, Watervliet, NY (US); Azar Alizadeh, Wilton, NY (US); Xiaolei Shi, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1909 days.

This patent is subject to a terminal disclaimer.

(21) Appl. No.: 11/901,725

(22) Filed: Sep. 18, 2007

(65) Prior Publication Data

US 2008/0158627 A1 Jul. 3, 2008

Related U.S. Application Data

(63) Continuation-in-part of application No. 11/376,545, filed on Mar. 15, 2006, now Pat. No. 7,388,695.

(60) Provisional application No. 60/845,579, filed on Sep. 19, 2006.

(51) Int. Cl.
| | | |
|---|---|---|
| *G03H 1/02* | (2006.01) | |
| *G03H 1/30* | (2006.01) | |
| *G11B 7/245* | (2006.01) | |
| *G11B 7/0065* | (2006.01) | |
| *G11B 7/24044* | (2013.01) | |
| *G03H 1/04* | (2006.01) | |
| *G11B 7/246* | (2013.01) | |
| *G11B 7/248* | (2006.01) | |

(52) U.S. Cl.
CPC . *G03H 1/02* (2013.01); *G03H 1/30* (2013.01); *G11B 7/245* (2013.01); *G11B 7/0065* (2013.01); *G11B 7/24044* (2013.01); *G03H 2001/0264* (2013.01); *G03H 2001/0417* (2013.01); *G03H 2222/54* (2013.01); *G03H 2260/12* (2013.01); *G03H 2270/53* (2013.01); *G11B 2220/2504* (2013.01); *G11B 7/246* (2013.01); *G11B 7/248* (2013.01)
USPC ........................................ 430/1; 430/2; 359/3

(58) Field of Classification Search
None
See application file for complete search history.

(56) References Cited

U.S. PATENT DOCUMENTS

| | | | |
|---|---|---|---|
| 3,847,644 A * | 11/1974 | Erhardt et al. | ............. 430/270.1 |
| 3,965,461 A | 6/1976 | Wreede et al. | |
| 5,111,445 A | 5/1992 | Psaltis et al. | |
| 5,339,305 A | 8/1994 | Curtis et al. | |
| 5,377,176 A | 12/1994 | Redfield | |
| 5,438,439 A | 8/1995 | Mok et al. | |
| 5,481,523 A | 1/1996 | Dewald | |
| 5,526,337 A | 6/1996 | Housey et al. | |
| 5,665,791 A | 9/1997 | Lee et al. | |
| 5,756,648 A | 5/1998 | Lee | |
| 5,759,721 A | 6/1998 | Dhal et al. | |
| 5,982,513 A | 11/1999 | Zhou et al. | |
| 5,995,292 A | 11/1999 | McDonald | |
| 6,020,985 A | 2/2000 | McLeod et al. | |
| 6,055,174 A | 4/2000 | Zhoou et al. | |
| 6,097,514 A | 8/2000 | Nishikawa | |
| 6,104,511 A | 8/2000 | Hesselink et al. | |
| 6,111,828 A | 8/2000 | McLeod et al. | |
| 6,147,782 A | 11/2000 | Daiber et al. | |
| 6,157,470 A | 12/2000 | Buse et al. | |
| 6,212,148 B1 | 4/2001 | Hesselink et al. | |
| 6,256,271 B1 | 7/2001 | McLeod | |
| 6,288,804 B1 | 9/2001 | Daiber et al. | |
| 6,310,850 B1 | 10/2001 | Sochava et al. | |
| 6,322,931 B1 | 11/2001 | Cumpston et al. | |
| 6,322,933 B1 | 11/2001 | Daiber et al. | |
| 6,501,571 B1 | 12/2002 | Wang et al. | |
| 6,512,606 B1 | 1/2003 | Lipson et al. | |
| 6,540,397 B2 | 4/2003 | Yoshinari et al. | |
| 6,549,664 B1 | 4/2003 | Daiber et al. | |
| 6,563,779 B1 | 5/2003 | McDonald et al. | |
| 6,574,174 B1 | 6/2003 | Amble et al. | |

| | | | |
|---|---|---|---|
| 6,625,100 | B2 | 9/2003 | Edwards |
| 6,992,805 | B2 | 1/2006 | Ingwall et al. |
| 7,052,812 | B1 | 5/2006 | Wang et al. |
| 7,361,432 | B2 | 4/2008 | Tanigawa et al. |
| 8,273,832 | B2 * | 9/2012 | McCloskey et al. .......... 525/404 |
| 8,647,794 | B2 * | 2/2014 | McCloskey et al. .............. 430/1 |
| 2001/0030934 | A1 | 10/2001 | Lipson et al. |
| 2002/0136143 | A1 | 9/2002 | Edwards |
| 2003/0123380 | A1 | 7/2003 | Waldman et al. |
| 2004/0004914 | A1 | 1/2004 | Ceshkovsky |
| 2004/0030732 | A1 | 2/2004 | Gerspach et al. |
| 2004/0072100 | A1 * | 4/2004 | Mizokuro et al. ....... 430/270.14 |
| 2004/0096776 | A1 | 5/2004 | Tanigawa et al. |
| 2004/0240012 | A1 | 12/2004 | Yasuda et al. |
| 2005/0046915 | A1 | 3/2005 | Takizawa et al. |
| 2005/0136333 | A1 | 6/2005 | Lawrence et al. |
| 2006/0078802 | A1 * | 4/2006 | Chan et al. ........................ 430/1 |

FOREIGN PATENT DOCUMENTS

| | | | |
|---|---|---|---|
| JP | 2003-089269 | * | 3/2003 |
| JP | 2003064247 | | 3/2003 |
| JP | 2003064247 | A | 3/2003 |
| JP | 2003-094825 | * | 4/2003 |
| JP | 2005283766 | | 10/2005 |
| WO | 9715050 | A1 | 4/1997 |
| WO | WO9715050 | | 4/1997 |

OTHER PUBLICATIONS

Schaertl et al., "FRS study of diffusional process in block copolymer/homopolymer blends containing glassy spherical micelles", Macromol. vol. 29(16) pp. 5297-5307 (1996).*
Kim et al., "Preparation and holographic recording of diarylethene-doped photochromic films", ETRI J. vol. 25(4) pp. 253-257 (Aug. 2003).*
Csete et al. "Laser induced periodic surface grating formation on polyethylene terephthalate", Appl. Surf. Sci., vol. Vol 133 pp. 5-16 (1998).*
Rebane et al. "Single femtosecond exposure recording of an image hologram by spectral hole burning . . . ", Opt. Lett., vol. 25(22) pp. 1633-1635 (Nov. 2000).*
Marc Dubois, et al., "Characterization of a preliminary narrow-band absorption material for holographic data storage" Proc. SPIE, vol. 5380, 589-596 (2004); doi:10.1117/12.556985.
Shi, Xiaolei, et al. "Improved sensitivity of dye-doped thermoplastic disks for holographic data storage" Journal of Applied Physics, vol. 102, Issue 1, pp. 014907 (2007).
European Search Report issued in connection with corresponding EP Application No. 06738323.2 on Jul. 14, 2009.
J. S. Splitter et al., "The Photochemical Behavior of Some o-Nitrostilbenes", Contribution From The Department of Chemistry and Radiation Laboratory, vol. 20, pp. 1086-1115, Aug. 1955.
H. Kogelnik, "Coupled Wave Theory for Thick Hologram Gratings", The Bell System Technical Journal, vol. 48, No. 9, pp. 2909-2947, Nov. 1969.
I. A. McCulloch, "Novel Photoactive Nonlinear Optical Polymers for Use in Optical Waveguides", Macromolecules, American Chemical Society, vol. 27, No. 7, pp. 1697-1702, 1994.
M. M. Wang et al., "Three-Dimensional Holographic Stamping of Multilayer Bit-Oriented Nonlinear Optical Media", Applied Optics, vol. 39, No. 11, pp. 1835-1841, Apr. 10, 2000.
Y. L. Loo et al., "Polymer Crystallization in 25-nm Spheres", Physical Review Letters, The American Physical Society, vol. 84, No. 18, pp. 4120-4123, May 1, 2000.
P. Huang et al., "Crystal Orientation Changes in Two-Dimensionally Confined Nanocylinders in a Poly(ethylene oxide)-b-polystyrene/Polystyrene Blend", Macromolecules, American Chemical Society, vol. 34, No. 19, pp. 6649-6657, Jul. 2, 2001.
S. Orlic et al., "High Density Multilayer Recording of Microgratings for Optical Data Storage", Proceedings of SPIE, vol. 5521, pp. 161-173, 2004.
L. Hesselink et al., "Holographic Data Storage Systems", Proceedings of the IEEE, vol. 92, No. 8, pp. 1231-1280, Aug. 2004.
S. K. Park et al., "Master and Slave Beam Servo Technique for Volumetric Bit-Wise Optical Data Storage", Japanese Journal of Applied Physics, vol. 44, No. 5B, pp. 3442-3444, May 24, 2005.
R. R. McLeod et al., "Microholographic Multilayer Optical Disk Data Storage", Applied Optics, vol. 44, No. 16, pp. 3197-3207, Jun. 1, 2005.
R. R. McLeod et al., "Holographic Storage Without Holography: Optical Data Storage by Localized Alteration of a Format Hologram", Optical Society of America, 3 pages, 2005.
R. R. McLeod et al., "Micro-Holographic Multi-Layer Optical Disk Data Storage", Optical Society of America, 3 pages, 2005.
M. Dubois et al., "Characterization of Micrograms Recorded in a Thermoplastic Medium for Three-Dimensional Optical Data Storage", Optical Society of America, vol. 30, No. 15, pp. 1947-1949, Aug. 1, 2005.
M. Nakano et al., "Light Propagation in a Multilayered Medium for Three-Dimensional Optical Memory", Applied Optics, vol. 44, No. 28, pp. 5966-5971, Oct. 1, 2005.
I. Ichimura et al., "Proposal for a Multilayer Read-Only-Memory Optical Disk Structure", Applied Optics, vol. 45, No. 8, pp. 1794-1803, Mar. 10, 2006.
O. Matoba et al., "Reflection-Type Holographic Disk Memory With Random Phase Shift Multiplexing", Applied Optics, vol. 45, No. 14, pp. 3270-3274, May 10, 2006.
S. Sakurai, "Control of Morphology in Block Copolymers", TRIP, vol. 3, No. 3. pp. 90-98, Mar. 1995.
Russian Office Action dated Apr. 9, 2010.
Dubois; article entitled "Characterization of Preliminary Narrow-Band Absorption Material for Holographic Data Storage", Proc. SPIE: Optical Data Storage 2004, vol. 5380, Oct. 20, 2004, p. 589-596.
"Holographic Information Storage in Azobenzene-Containing Diblock Copolymers", SPIE, PO Box 10 Bellingham WA 98227-0010 USA.

* cited by examiner

*Primary Examiner* — Martin Angebranndt
(74) *Attorney, Agent, or Firm* — Jean K. Testa; Fletcher Yoder, P.C.

(57) ABSTRACT

A method for storing holographic data, said method comprising: step (A) providing an optically transparent substrate comprising a polymer composition and a light absorbing chromophore, said polymer composition comprising a continuous phase and a dispersed phase, said dispersed phase being less than about 200 nm in size; and step (B) irradiating a volume element of the optically transparent substrate with a holographic interference pattern, wherein the pattern has a first wavelength and an intensity both sufficient to cause a phase change in at least a portion of the dispersed phase within the volume element of the substrate to produce within the irradiated volume element refractive index variations corresponding to the holographic interference pattern, thereby producing an optically readable datum corresponding to the volume element.

15 Claims, 18 Drawing Sheets

| Mw (KG/mol) | $\phi_{PEO}$ Volume fraction of PEO | $\Delta H_m^1$ (J/g) | $\alpha$ = Normalized crystallinity | Estimated $\Delta n_{est}$ | Measured $\Delta n$ |
|---|---|---|---|---|---|
| 25.4 | 0.25 | 30.75 | 0.61 | 0.008±0.002 | --- |
| 53.0 | 0.28 | 35.65 | 0.64 | 0.009±0.002 | --- |
| 62.5 | 0.18 | 23.27 | 0.64 | 0.006±0.002 | 0.005 |
| 288.0 | 0.21 | 27.51 | 0.66 | 0.007±0.002 | 0.005 |

FIG. 9

FIG. 10A (reversed — FIG. 10A)

METHOD FOR STORING HOLOGRAPHIC DATA

CLAIM FOR PRIORITY

This Application claims the benefit of U.S. Provisional Patent Application Ser. No. 60/845,579 filed on Sep. 19, 2006 entitled METHOD FOR STORING HOLOGRAPHIC DATA, and is a continuation-in part of U.S. patent application Ser. No. 11/376,545, filed Mar. 15, 2006 now U.S. Pat. No. 7,388,695, entitled DATA STORAGE DEVICES AND METHODS, the subject matter thereof incorporated by reference in their entireties.

BACKGROUND

The present disclosure relates to methods for storing holographic data. Further, the present disclosure relates to holographic data storage media and articles having enhanced data storage capabilities which are derived from these methods.

Holographic storage is the storage of data in the form of holograms, which are images of three dimensional interference patterns created by the intersection of two beams of light, in a photosensitive medium. The superposition of a signal beam, which contains digitally encoded data, and a reference beam forms an interference pattern within the volume of holographic data storage medium. The holographic data storage medium typically comprises a photochemically reactive species which upon irradiation of the storage medium with the interference pattern results in a chemical reaction that changes or modulates the refractive index of the medium as a function of the characteristics of the interference pattern in a given volume element. This modulation serves to record as the hologram both the intensity and phase information from the signal. The hologram can later be retrieved by exposing the storage medium to the reference beam alone, which interacts with the stored holographic data to generate a reconstructed signal beam proportional to the initial signal beam used to store the holographic image. Thus, in holographic data storage, data is stored throughout the volume of the medium via three dimensional interference patterns.

Each hologram may contain anywhere from one to $1 \times 10^6$ or more bits of data. One distinct advantage of holographic storage over surface-based storage formats, including CDs or DVDs, is that a large number of holograms may be stored in an overlapping manner in the same volume of the photosensitive medium using a multiplexing technique, such as by varying the signal and/or reference beam angle, wavelength, or medium position. However, a major impediment towards the realization of holographic storage as a viable technique has been the development of a reliable and economically feasible storage medium.

Early holographic storage media employed inorganic photo-refractive crystals, such as doped or un-doped lithium niobate ($LiNbO_3$), in which incident light creates refractive index changes. These refractive index changes are due to the photo-induced creation and subsequent trapping of electrons leading to an induced internal electric field that ultimately modifies the refractive index through a linear electro-optic effect. However, $LiNbO_3$ is expensive, exhibits relatively poor efficiency, fades over time, and requires thick crystals to observe any significant index changes.

Therefore, there is a need for improved holographic data storage methods and materials through which enhanced holographic data storage capacities can be achieved. Further, there is also a need for methods to enhance the stability of the stored holographic data, such that for example, the data is not erased by exposure to ambient light, modest temperature changes, or during read-out.

SUMMARY

Disclosed herein are methods for storing holographic data in a storage medium having enhanced data storage capabilities, and articles made using these methods.

In one aspect, the present invention provides a method for storing holographic data, said method comprising:

step (A) providing an optically transparent substrate comprising a polymer composition and a light absorbing chromophore, said polymer composition comprising a continuous phase and a dispersed phase, said dispersed phase being less than about 200 nm in size; and step (B) irradiating a volume element of the optically transparent substrate with a holographic interference pattern, wherein the pattern has a first wavelength and an intensity both sufficient to cause a phase change in at least a portion of the dispersed phase within the volume element of the substrate to produce within the irradiated volume element refractive index variations corresponding to the holographic interference pattern, thereby producing an optically readable datum corresponding to the volume element.

In another aspect, the present invention provides a holographic data storage medium comprising an optically transparent substrate said optically transparent substrate comprising a polymer composition and a light absorbing chromophore, said polymer composition comprising a continuous phase and a dispersed phase, said dispersed phase being less than about 200 nm in size.

In yet another embodiment, the present invention provides a data storage medium having at least one optically readable datum stored therein, the data storage medium comprising:

a polymer composition and a light absorbing chromophore, said polymer composition comprising a continuous phase and a dispersed phase, said dispersed phase being less than about 200 nm in size;

wherein the optically readable datum is stored as a hologram patterned within at least one volume element of the optically transparent substrate.

These and other features, aspects, and advantages of the present invention may be more understood more readily by reference to the following detailed description.

BRIEF DESCRIPTION OF THE FIGURES

Understanding of the present invention will be facilitated by considering the following detailed description of the preferred embodiments of the present invention in conjunction with the accompanying drawings, in which like numerals refer to like parts, and:

FIG. 9 illustrates a data table including percent crystallinity in sphere-forming block copolymers and change in PEO Mw;

FIGS. 10C-10D illustrate a light intensity and corresponding refractive index change in a substantially non-linear optically responsive medium;

DETAILED DESCRIPTION

Figure 1:
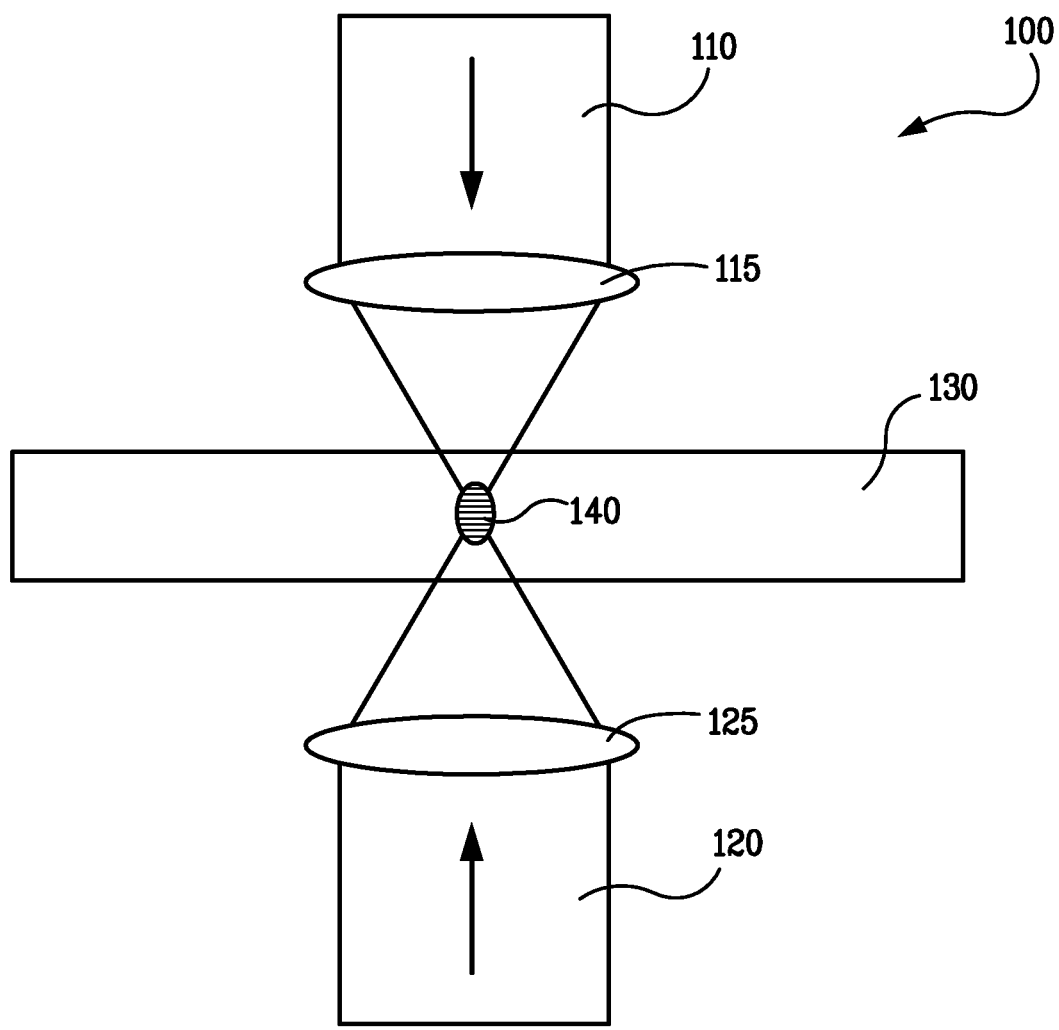
FIG. 1 illustrates a configuration for forming a hologram within a media using counter-propagating light beams.

Some aspects of the present invention and general scientific principles used herein can be more clearly understood by referring to U.S. Patent Application 2005/0136333 (Ser. No. 10/742,461), which was published on Jun. 23, 2005; U.S. Patent Application 2006/0073392 A1 (Ser. No. 10/954,779) which was published on Apr. 6, 2006; and co-pending Application having Ser. No. 11/260,806, filed on Oct. 27, 2005; all of which are incorporated herein by reference in their entirety.

As defined herein, the term "optically transparent" as applied to an optically transparent substrate or an optically transparent plastic material means that the substrate or plastic material has an absorbance of less than 1. That is, at least 10 percent of incident light is transmitted through the material at least one wavelength in a range between about 300 to about 800 nanometers. For example, when configured as a film having a thickness suitable for use in holographic data storage said film exhibits an absorbance of less than 1 at least one wavelength in a range between about 300 and about 800 nanometers.

As defined herein, the term "volume element" means a three dimensional portion of a total volume.

As defined herein, the term "optically readable datum" can be understood as a datum that is stored as a hologram patterned within one or more volume elements of an optically transparent substrate.

As noted, holographic data storage relies upon the introduction of localized variations in the refractive index of the optically transparent substrate comprising the photochemically active dye as a means of storing holograms. The refractive index within an individual volume element of the optically transparent substrate may be constant throughout the volume element, as in the case of a volume element that has not been exposed to electromagnetic radiation, or in the case of a volume element in which the photosensitive component has been irradiated to the same degree throughout the volume element. It is believed that most volume elements that have been exposed to electromagnetic radiation during the holographic data writing process will contain a complex holographic pattern, and as such, the refractive index within the volume element will vary across the volume element. In instances in which the refractive index within the volume element varies across the volume element, it is convenient to regard the volume element as having an "average refractive index" which may be compared to the refractive index of the corresponding volume element prior to irradiation. Thus, in one embodiment an optically readable datum comprises at least one volume element having a refractive index that is different from a (the) corresponding volume element of the optically transparent substrate prior to irradiation.

Data storage is traditionally achieved by locally changing the refractive index of the data storage medium in a graded fashion (continuous sinusoidal variations), rather than discrete steps, and then using the induced changes as diffractive optical elements.

Volumetric optical storage systems have the potential to fulfill demands for high-capacity data storage. Unlike traditional optical disc storage formats, such as compact disc (CD) and digital versatile disc (DVD) formats, where the digital information is stored in a single (or at most two) reflective layer(s), according to an aspect of the present invention, the holograms representing digital content are stored as localized refractive index alterations in a plurality of volumes arranged in stacked (e.g. vertically), directed (e.g. laterally) tracks in the storage medium. Each of the laterally directed tracks may define a corresponding laterally, e.g., radially, directed layer.

According to an aspect of the present invention, single bits, or groups of bits, of data may be encoded as individual micro-holograms each substantially contained in a corresponding volume element. In one embodiment, the medium, or media, takes the form of an injection moldable thermoplastic disc, and exhibits one or more non-linear functional characteristics. The non-linear functional characteristics may be embodied as a refractive index change that is a non-linear function of exposure to an energy source, such as a holographic interference pattern (incident optical intensity), or heat. In such embodiments, by generating interference fringes within a given volume element of the medium, one or more bits of data may be selectively encoded in that volume element as detectable refractive index modulations which represent the stored holographic data.

According to an aspect of the present invention, a non-linear functional characteristic may establish a threshold energy responsive condition, below which no substantial change in refractive index occurs in the optically transparent substrate, and above which measurable changes in the refractive index of the optically transparent substrate are induced. In this manner, holographic data stored within a selected volume element of the optically transparent substrate can be read, or recovered, by exposure of the data-containing volume element to a read beam having an effective energy less than the threshold energy. Similarly, holographic data can be written or erased using a light beam having an effective energy in excess of the threshold energy. Accordingly, in one embodiment, dense matrices of volumes that each may, or may not, have a micro-hologram substantially contained therein may be established. Each of the micro-holograms is embodied in the optically transparent substrate as an alternating pattern of sub-regions having differing refractive indices, which correspond to the interference fringes of counter-propagating light beams used to write the micro-holograms. Where the refractive index modulation decays rapidly as a function of distance from a target volume, such as an encoded bit center, the more densely the volumes may be packed.

According to an aspect of the present invention, the refractive index changes in a particular volume element may be induced by localized heating patterns corresponding to the interference fringes of counter-propagating laser beams passing through the volume element. In one embodiment, the refractive index change results from a density difference between an amorphous state and a crystalline state of a thermoplastic medium. A transition from one state to the other state may be selectively induced within target volume elements within the medium by thermally activating the target volume elements by exposure of the target volume elements to the interference fringes of a holographic interference pattern.

In one embodiment, the present invention provides a method for storing holographic data within an optically transparent substrate comprising a polymer composition having a continuous phase and a dispersed phase. The polymer composition may comprise a polymeric blend in which the components comprising the blend form a continuous phase and a dispersed phase. Alternately, the polymer composition may comprise a block copolymer which forms a continuous phase and a dispersed phase, for example an A-B block copolymer in which the A block forms the continuous phase and the B block forms the dispersed phase. Typically, the dispersed phase of the polymer composition takes the form of tiny domains having a size less than about 200 nanometers (nm). This means that while the domains of the dispersed phase may vary in size, on average the longest path length across a domain of the dispersed phase will be less than about 200 nm in length. In one embodiment, the average longest path length across a domain of the dispersed phase will be less than about 100 nm in length. In another embodiment, the average longest path length across a domain of the dispersed phase will be less than about 50 nm in length. In yet another embodiment, the average longest path length across a domain of the dispersed phase will be less than about 40 nm in length. The domains of the dispersed phase are distributed essentially uniformly throughout the continuous phase. Block copolymers of styrene and ethylene oxide illustrate copolymers which form a continuous phase (polystyrene blocks) and a dispersed phase (polyethylene oxide blocks) and which are suitable for use in the polymer compositions used according to the method of the present invention.

In one embodiment, the polymer composition is selected such that the dispersed phase is initially present in the polymer composition in an amorphous state or a crystalline state. As the optically transparent substrate comprising the polymer composition comprising the continuous phase and the dispersed phase is irradiated with a holographic interference pattern, a light absorbing chromophore present in the polymer composition absorbs light and creates hot spots as a function of the intensity of the holographic interference pattern. The hot spots correspond to regions of constructive interference within the holographic interference pattern. The heat generated within the regions of constructive interference causes that portion of the dispersed phase within a hot spot to undergo a phase change from either an amorphous state to a crystalline state, or from a crystalline state to an amorphous state. Although heat dissipates into the surrounding polymer composition after irradiation, the temperature rise outside of the hot spots is insufficient to effect a phase change of the dispersed phase outside of the hot spots.

In one embodiment, the dispersed phase is uniformly distributed throughout the continuous phase. Typically, the dispersed phase is uniformly distributed through the continuous phase as nano-domains the longest average path length across which is less than about 200 nm. Changes in the refractive index within the optically transparent substrate corresponding to an optically readable datum can occur by a variety of mechanisms as the optically transparent substrate is exposed to the holographic interference pattern. In a first instance, localized heating within the regions of constructive interference causes the dispersed phase to coalesce with the continuous phase in the region of the hot spot thereby creating refractive index gradients. In a second instance, the polymer composition comprising a dispersed phase and a continuous phase undergoes an order to disorder transition upon heating within the regions of constructive interference of the holographic interference pattern. In one embodiment, the phase change occurring in the hot spots results in an increase in an initial refractive index mismatch between the continuous phase and the dispersed phase. In an alternate embodiment, the phase change occurring in the hot spots results in a decrease in an initial refractive index mismatch between the continuous phase and the dispersed phase. In yet another embodiment, the phase change occurring in the hot spots results in the creation of a refractive index mismatch between the continuous phase and the dispersed phase.

According to an aspect of the present invention, loss of dynamic range in affected volume elements other than the target volume element during hologram formation is mitigated by using a recording material exhibiting a non-linear response to experienced power density. In other words, an optically transparent substrate exhibiting a non-linear recording property may be used in combination with the formation of a micro-holograms. The non-linear recording property of the optically transparent substrate is used to facilitate recording of holograms within the optically transparent substrate that is non-linear with light intensity (e.g. square, cubic, or of the threshold type), such that recording occurs only above a certain threshold light intensity. Such a non-linear recording characteristic of the optically transparent substrate reduces or eliminates loss of dynamic range in non-addressed volume elements, and facilitates reduction of the dimensions of the micro-holograms, and target volume elements.

Figure 2:
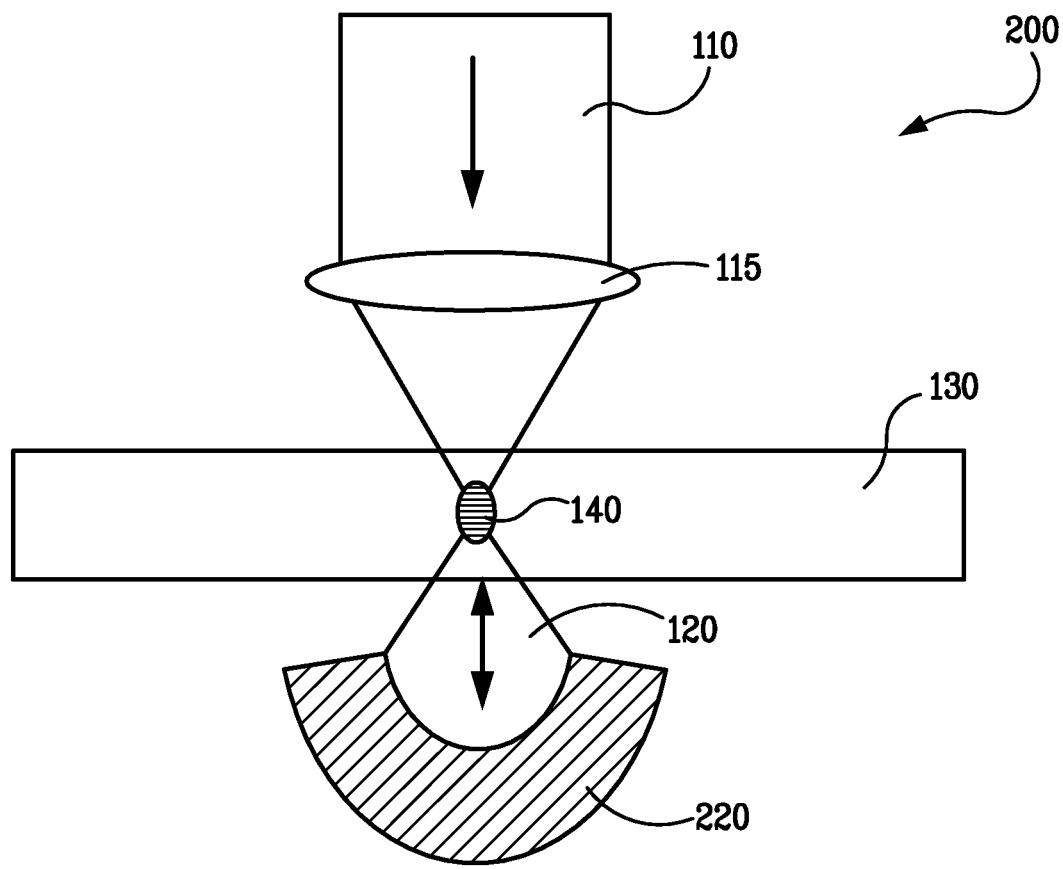
FIG. 2 illustrates an alternative configuration for forming a hologram within a media using counter-propagating light beams.

FIG. 1 shows an exemplary configuration 100 for forming a hologram within a media using counter-propagating light beams. Micro-holographic recording results from two counter-propagating light beams 110, 120 interfering to create fringes in a volume 140 of a recording medium 130. Interference may be achieved by focusing light beams 110, 120 at nearly-diffraction-limited diameters (such as around 1 micrometer (μm) or smaller) at a target volume, e.g., desired location, within recording medium 140. Light beams 110, 120 may be focused using a conventional lens 115 for light beam 110 and lens 125 for light beam 120. While simple lensing is shown, compound lens formats may of course be used. FIG. 2 shows an alternative configuration 200 for forming a hologram within a hologram supporting media using counter-propagating light beams. In configuration 200, lens 125 has been replaced by a curved mirror 220, such that a focused reflection 120 of light beam 110 interferes with light beam 110 itself. Configurations 100, 200 require highly precise alignment of both lenses 115, 125 or of lens 115 and mirror 220 relative to each other.

Figure 10A:
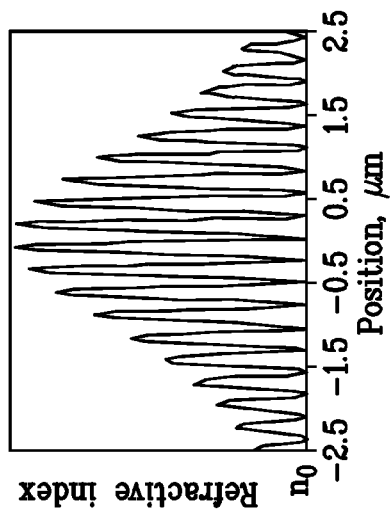
FIGS. 10A-10B illustrate a light intensity and corresponding refractive index change in a substantially linear optically responsive medium.
Figure 10B:
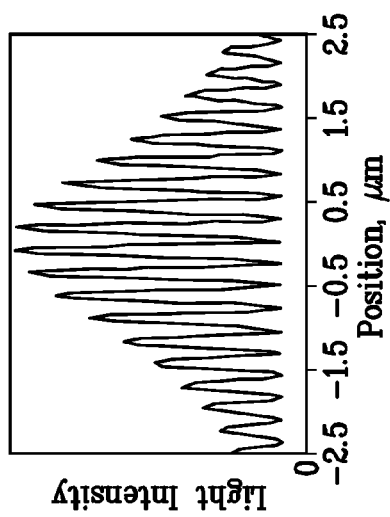
Figure 10B:
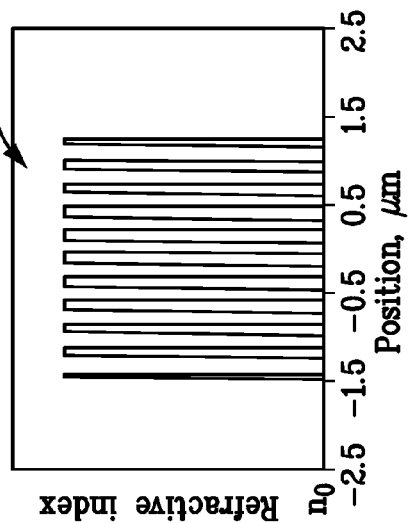
Figure 10D:
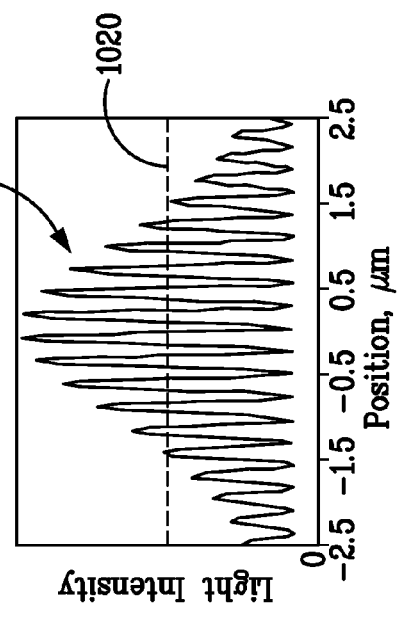
Figure 11A:
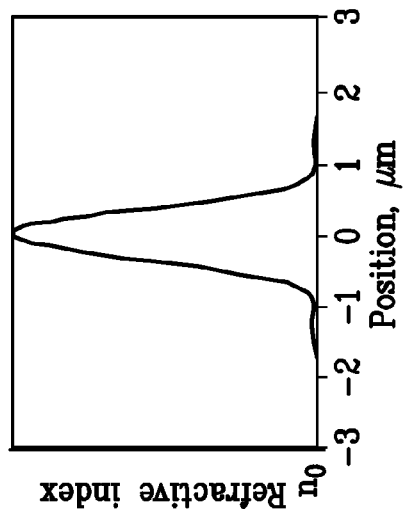
FIGS. 11A-11B illustrate a light intensity and corresponding refractive index change in a substantially linear optically responsive medium.
Figure 11B:
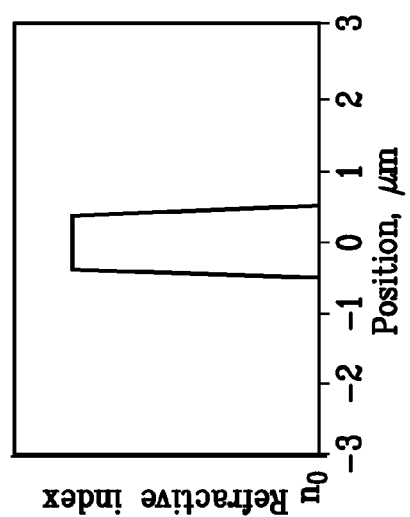
Figure 11C:
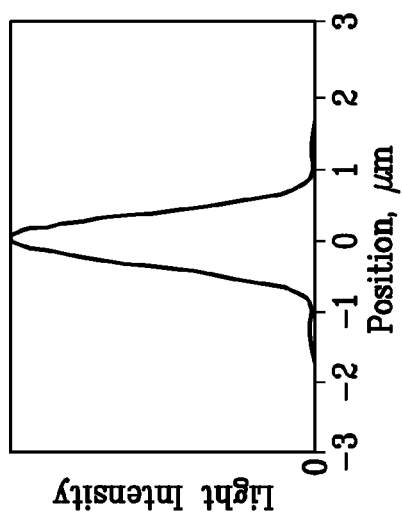
FIGS. 11C-11D illustrate a light intensity and corresponding refractive index change in a substantially non-linear optically responsive medium.
Figure 11D:
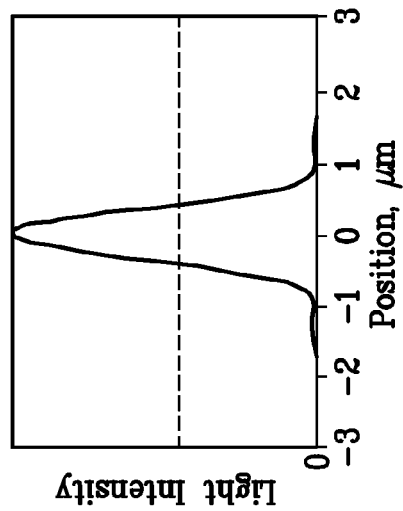

FIGS. 10A-B and 11A-B illustrate recording characteristics of a linear recording medium, while FIGS. 10C-D and 11C-D illustrate recording characteristics of a non-linear recording medium of a threshold type. More specifically, FIGS. 10A-10D show that interfering two focused, counter-propagating light beams, as shown in FIGS. 1 and 2, produces a modulation of the light intensity, where position 0 (mid-way between −0.5 and 0.5) corresponds to the focal point along the medium thickness of both focused light beams. In the case of a medium presenting linear recording properties, a refractive index modulation like that shown in FIG. 10B will result in an intensity profile like that shown in FIG. 10A. While the refractive index modulation may ultimately maximize near position 0, it may be noted that it extends substantially over the full thickness of the material and is not limited, for example, to the position (abscissa) values in FIG. 10B such that resulting micro-holograms are not substantially contained within a particular volume element within the medium, where multiple volumes are stacked one-upon another. In contrast, a recording medium which exhibits a non-linear or threshold property (e.g. a threshold condition such as that shown in FIGS. 10C and 10D), recording 1010 occurs substantially only in the volume elements where a threshold condition 1020 is reached such that resulting micro-holograms are substantially contained within selected volume elements, where multiple volume elements are stacked one-upon another. FIG. 10D illustrates an instance in which the micro-hologram inducing interference fringes extend over approximately 1-20 um. In one embodiment, the micro-hologram inducing interference fringes extend over approximately about 3 μm. Similar characteristics are exhibited in the lateral dimensions of the micro-hologram as illustrated in FIGS. 11A-11D. As is demonstrated in FIGS. 11A-11D, undesirable loss of dynamic range of untargeted volume elements of a recording medium is mitigated by using a non-linearly responsive material of the threshold type.

While a threshold type non-linearly responsive material is discussed for purposes of explanation, it should be understood that to a first-order approximation, the amplitude of the refractive index modulation varies linearly with the light intensity in a linear responsive material (see FIGS. 10A-10B, 11A-11B). Thus, even though a material having a recording threshold may prove particularly desirable, for a material that exhibits a non-linear optical response to exposure to a holographic interference pattern which results in modulation of the refractive index of target volume elements within the recording medium, the amplitude of the refractive index modulation varies, e.g., like a power larger than one (or a combination of powers) would significantly mitigate dynamic range consumption in other affected volumes.

Photopolymers have been proposed as a recording medium candidate for holographic storage systems. Photopolymer based media exhibit reasonable refractive index changes and sensitivities. Holographic data are recorded within a gel-like medium sandwiched between glass substrates. However, it is desirable to provide a simplified recoding media, such as a molded disc. Photopolymers are also linearly responsive materials and so do not meet the threshold requirement for high density single bit holographic optical data storage as described in this application. Further, photopolymer systems are sensitive to environmental conditions, i.e., ambient light, and often require special handling prior to, during and even sometimes after the recording process. It is desirable to eliminate these drawbacks as well.

According to an aspect of the present invention, a polymer phase-change material in which refractive index modulations are induced via exposure to a light beam is used as a holographic data storage medium. In one embodiment, the detectable change in refractive index results from thermally inducing localized changes between amorphous and crystalline components of the material. This provides for potentially large refractive index modulations induced using relatively low optical exposure energies. Such a material may also provide for a threshold condition, in which optical exposure energies below a threshold have little or no impact on the refractive index of the material, while optical exposure energies above the threshold cause detectable refractive index changes.

More particularly, polymer compositions susceptible to a phase-change induced by exposure to a holographic interference pattern can provide large refractive index changes ($\Delta n>0.001$), with good sensitivity (S>500 or more cm/J), and be used as injection-moldable, environmentally-stable, thermoplastic, optically transparent substrates. Additionally, such materials hold potential for use in substantially threshold-responsive recording processes thereby enabling a same wavelength laser to be used for both reading and writing, while preventing ambient light exposure from substantially degrading stored data. In one embodiment, the detectable refractive index change corresponds to the index difference between the amorphous and crystalline states of one of the components of a thermoplastic copolymer. In one embodiment, the optically transparent substrate comprising a copolymer comprising a crystalline dispersed phase is primed for the recording of holograms by elevating the optically transparent substrate above the melting temperature ($T_m$) of the dispersed phase and then rapidly cooling ("quenching") the optically transparent substrate to induce the previously crystalline components of the material to cool in an amorphous state.

Figure 14A:
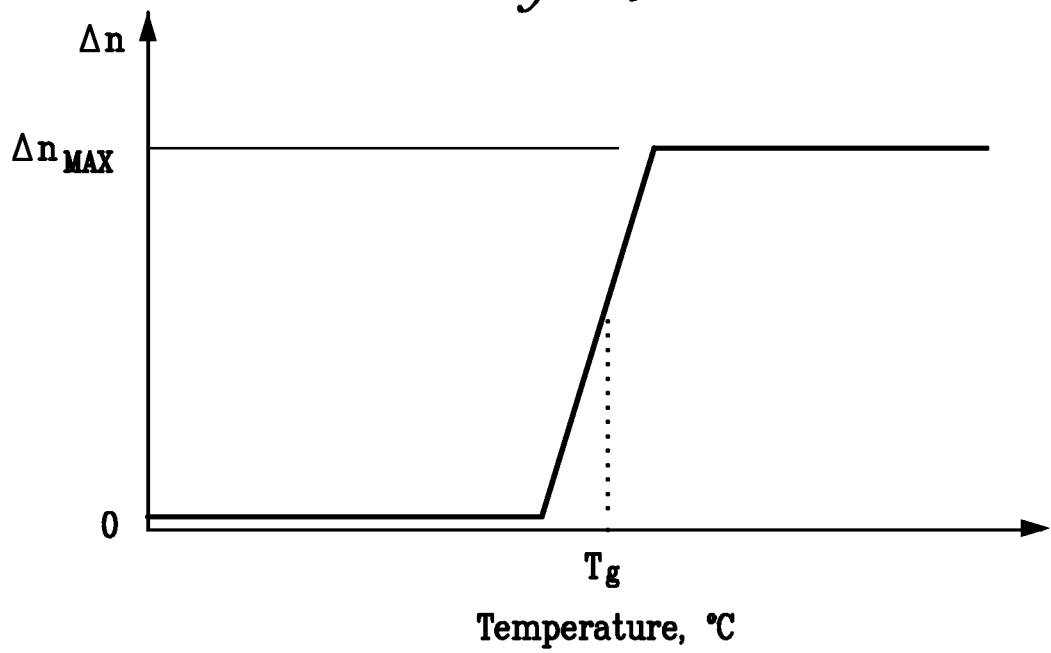
FIGS. 14A and 14B illustrate expected refracted index changes as a function of elevating temperature, and corresponding micro-hologram read and write modes.
Figure 14B:
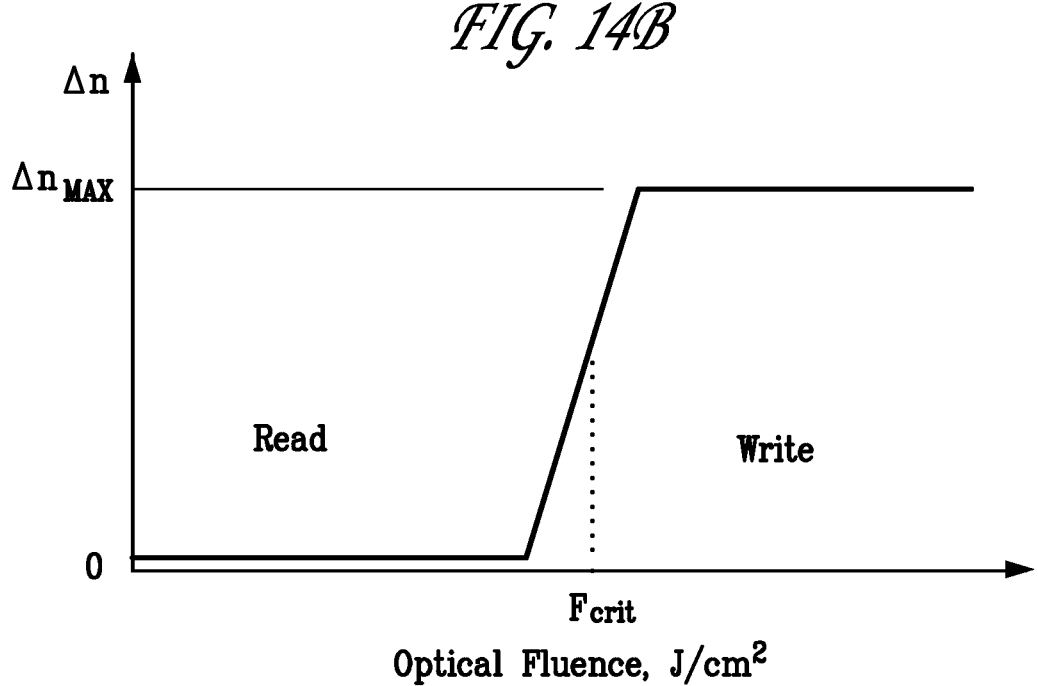

Referring to FIGS. 14A and 14B, illustrate features of the present invention wherein a holographic interference pattern interacts with a target volume element of the optically transparent substrate to heat at least a portion of the target volume element as a result of energy absorption by a light absorbing chromophore present in the target volume element. Once the temperature volume element rises above a critical temperature, for example the melting temperature ($T_m$) of a crystalline dispersed phase within the target volume element (FIG. 14A), melting of at least a portion of the crystalline dispersed phase within the target volume element occurs. As the heat within the target volume element dissipates into neighboring volume elements the temperature of the target volume element decreases and at least a portion of the dispersed phase within the target volume element is fixed in an amorphous state. The refractive index difference between the target volume element prior to exposure to the holographic interference pattern and the after exposure provides an effective means of recording the holograms which represent optically readable data. The critical temperature may be above or below the glass transition temperature ($T_g$) of a non-crystallizable portion of a block copolymer. Where the energy of the incident light beam is not sufficient to elevate the temperature of the material within the target volume element above the critical temperature, substantially no change in refractive index takes place. This is shown in FIG. 14B, where an optical fluence above a critical value $F_{crit}$ causes a phase change resulting in the writing of a hologram, and an optical fluence less than the critical value $F_{crit}$ causes substantially no such change and is thus suitable for reading recorded holograms, and hence recovering recorded data.

Figure 15A:
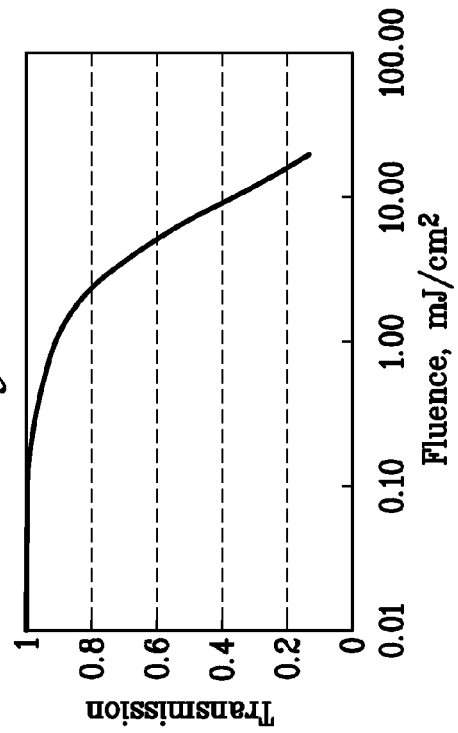
FIGS. 15A-15C illustrate expected relationships between light beam incident light beam energy required to elevate material temperature to the critical temperature as a function of corresponding optical fluence and normalized linear absorption, light beam waist and distance using a reverse saturable absorber, and transmission and fluence using a reverse saturable absorber.
Figure 15B:
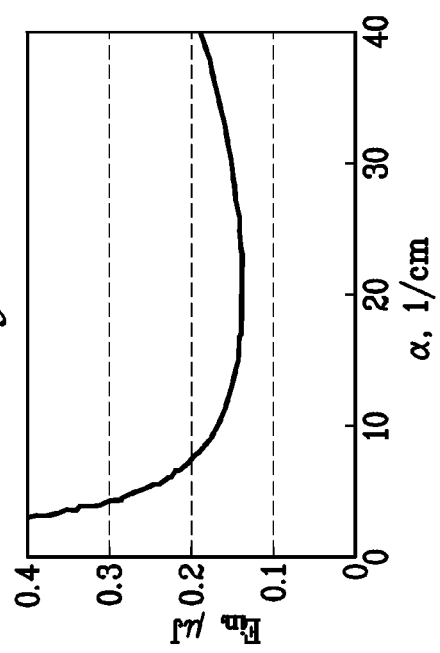
Figure 15C:
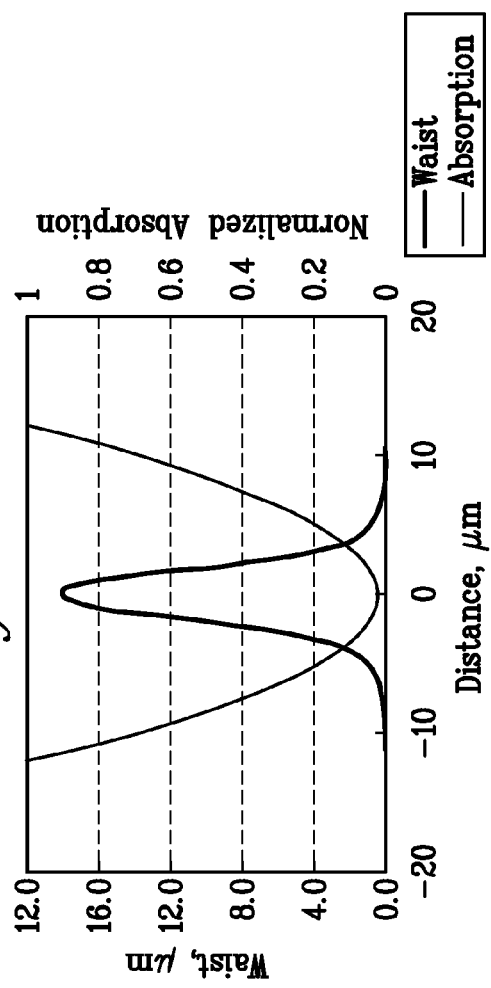

For non-limiting purposes of further explanation, the critical value is given by $F_{CRIT}=L \times \rho \times c_P \times \Delta T$, where L is the length, or depth, of a micro-hologram, $\rho$ is the material density, $c_p$ is the specific heat of the material, and $\Delta T$ is the experienced temperature change (i.e., $T_g$-$T_0$, where $T_g$ is the glass transition temperature and $T_0$ is the ambient temperature of the material). As an example, where a polycarbonate having a density of 1.2 g/cm$^3$ and a specific heat of 1.2 J/(K·g) is used, the length of the micro-hologram is 5×10$^{-4}$ cm, and the temperature change is 125° C. (K), $F_{CRIT}$=90 mj/cm$^2$. Translated to energy terms, the energy ($E_{CRIT}$) needed to reach the critical fluence $F_{CRIT}$ is $$E_{CRIT} = F_{CRIT} \times A = F_{CRIT} \times \frac{\pi w_o^2}{2},$$

where A is the transverse area of the hologram and $w_o$ is the light beam waist. The energy at focus, $E_F$, needed to provide $E_{CRIT}$ is $$E_F = \frac{E_{CRIT}}{(1 - e^{-\alpha L})},$$

where $e^{-\alpha L}$ is the transmission, $\alpha=\alpha_0+\alpha_{NL}F$, $\alpha_0$ is the linear absorption of the material, $\alpha_{NL}$ is the non-linear absorption of the material, F is the maximum incidence optical fluence, and L is the length of the micro-hologram. The incident energy, $E_{IN}$, delivered to the material to provide needed energy at focus, $E_F$, is $$E_{IN} = \frac{E_{CRIT}}{(1 - e^{-\alpha L})e^{-\alpha D/2}},$$

where $e^{-\alpha L}$ is the transmission, $\alpha=\alpha_0+\alpha_{NL}F$, $\alpha_0$ is the linear absorption of the material, $\alpha_{NL}$ is the non-linear absorption of the material, F is the maximum incidence optical fluence, L is the length of the micro-hologram, and D is the depth (or length) of the material (e.g., the thickness of the media disc). Referring now also to FIGS. 15A-15C, assuming a light beam waste, $w_o$, of 0.6×10$^{-4}$ cm, the transverse area of the hologram, A, is 5.65×10$^{-9}$ cm$^2$. Still assuming a depth of the micro-hologram, L, to be 5×10$^{-4}$ cm, and the depth of the material D (e.g., entire media disc) to be 1 mm, a predicted relation between incident energy, $E_{IN}$, and $\alpha$ is shown in FIG. 15A. Further assuming a material linear absorption, $\alpha_0$, of 0.018 l/cm, and a material non-linear absorption, $\alpha_{NL}$, of 1000 cm/J (and still a material length of 0.1 cm), a predicted relation between transmission and fluence is shown in FIG. 15B. Using these same assumptions, predicted relations between light beam waist and distance, and normalized absorption and distance are shown in FIG. 15C.

Figure 16A:
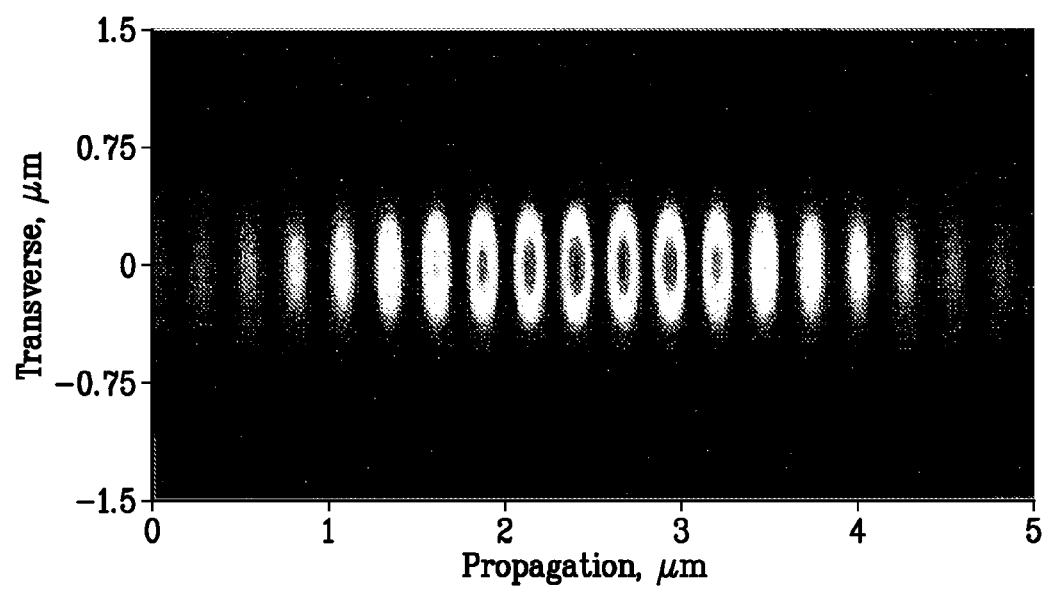
FIGS. 16A and 16B illustrate expected counter-propagating light beam exposures within a media, and corresponding temperature increases.
Figure 16B:
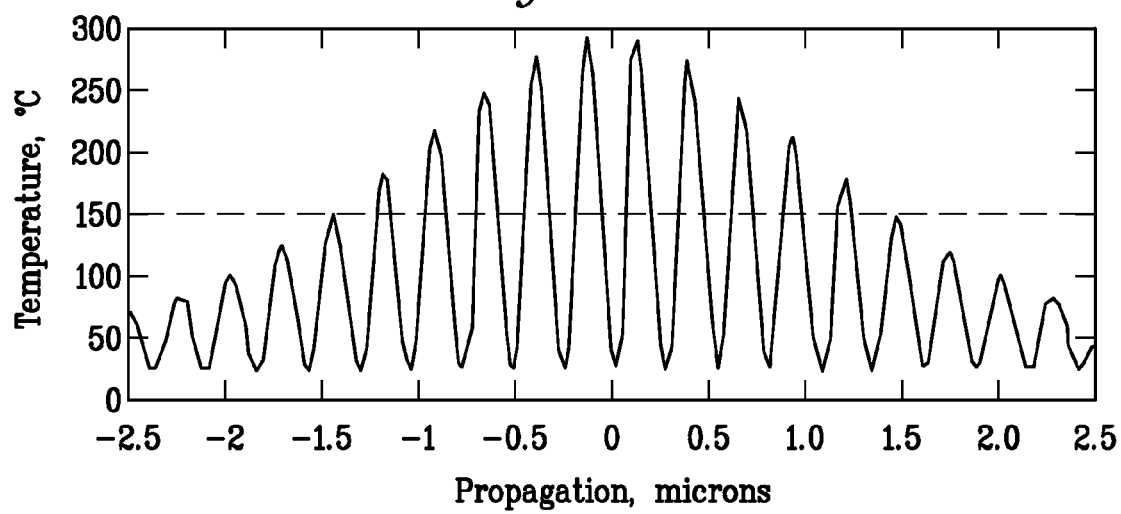
Figure 16C:
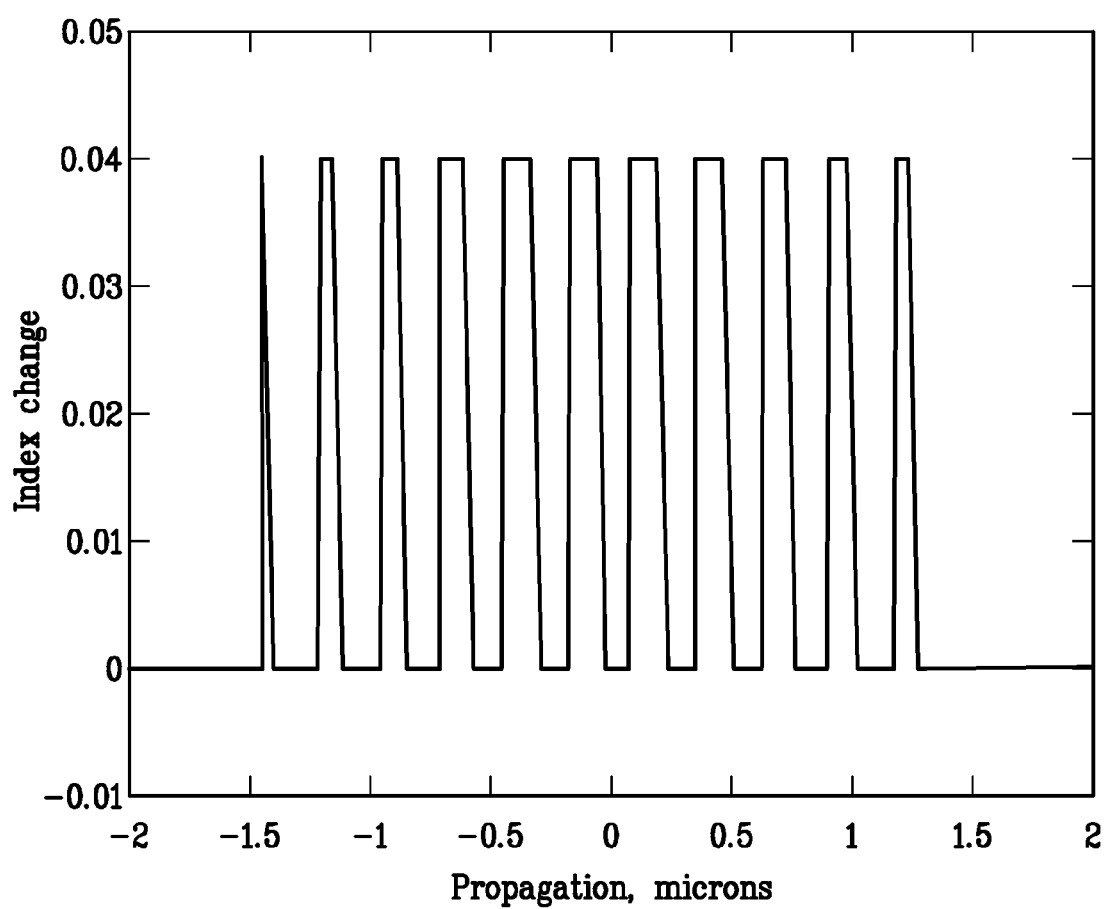
FIG. 16C illustrates an expected refractive index change corresponding to the temperature increases of FIGS. 16A and 16B.

As is shown in FIGS. 16A and 16B, in one embodiment, exposure of a suitable recording medium comprising a polymer composition comprising a continuous phase, a dispersed phase, and a light absorbing chromophore to a holographic interference pattern will result in the formation of holograms within the volume elements of the recording medium in the form of modulations in refractive index. The modulations in refractive index corresponding to the interference fringes of the holographic interference pattern result from phase changes associated with the dispersed phase of the polymer composition, in certain instances the formation or destruction of crystalline nano-domains within the polymer composition. In one embodiment, the dispersed phase comprises amorphous nano-domains comprising the dispersed phase which are converted to crystalline nano-domains upon exposure to the holographic interference pattern. In another embodiment, crystalline nano-domains are converted to amorphous nano-domains upon exposure to the holographic interference pattern. Thus, a phase change imparts a refractive index modulation based on the formation or destruction of crystalline nano-domains. The nano-domains comprising the dispersed phase are substantially smaller than the wavelength of the light being used. The values of FIG. 16B are predicted using a holographic interference pattern generated from two counter-propagating beams each having an incident, single beam power (P1=P2) of 75 mW, $\alpha=20$ cm$^{-1}$ and an exposure time (T) of 1 ms. A resulting refractive index change is predicted to be on the order of about 0.04 RI units ($\Delta n=0.04$) that forms the micro-hologram shown in FIG. 16C. As can be seen therein, a micro-hologram embodied as a series of refractive index changes corresponding to interference fringes produced by the counter-propagating light beams occurs substantially only where a localized heating exceeds a threshold condition (e.g., the temperature exceeds a critical temperature needed to convert the at least some of the nano-domains of the dispersed phase into crystalline or amorphous nano-domains). In one embodiment, the threshold condition is a temperature exceeding the glass transition temperature ($T_g$) of the dispersed phase. In another embodiment, the threshold condition is a temperature exceeding the melting point ($T_m$) of a dispersed phase which is crystalline. In an alternate embodiment, the threshold condition is a temperature at which the dispersed phase and the continuous phase coalesce. In still another embodiment, the threshold condition is a crystallization temperature ($T_c$) of a dispersed phase which is amorphous. Such threshold conditions are at times herein referred to as that a threshold recording conditions.

In one embodiment, the polymer composition comprises a homopolymer having a continuous phase and a dispersed phase. Suitable homopolymers for use, include, by way of non-limiting example, homopolymers displaying partial crystallinity. In another embodiment, blends of homopolymers composed of amorphous and crystalline polymers may be employed. In yet another embodiment, the polymer composition comprises a copolymer which may be a random copolymer or a block copolymer. In one embodiment, the polymer composition may comprise two or more homopolymers, two or more copolymers, or at least one homopolymer and at least one copolymer. Block copolymers with relatively large blocks are particularly useful polymer compositions with which to prepare the optically transparent substrate used for holographic data storage. Immiscible polymer blends, where microphase separation gives rise to domains of the dispersed phase which are smaller than the wavelength of the holographic interference pattern (i.e. less than about 200 nm), are also useful as threshold materials. Typically, holograms are stored at a depth within an optically transparent substrate comprising the polymer composition on the order of 0.5 to 20 micrometers (microns) deep with about 3 mircrons being the optimal hologram depth in certain embodiments.

A thermally induced phase change sensitized and localized by the presence of a light absorbing chromophore is well suited for recording holographic data and enables potentially large sensitivities. According to an aspect of the present invention, the process of the present invention provides a non-linear responsive mechanism for the optically induced refractive index change. This mechanism, or threshold condition, enables optical beams of a same wavelength to be used at low and high powers for data reading and recording, respectively. This characteristic also prevents ambient light from substantially degrading the stored data. Dyes with a reverse saturable absorption property, in which the absorption is a function of the fluence and increases with increasing fluence, are useful as the light absorbing chromophore. As a consequence of the reverse saturable absorption property, absorption of light by the chromophore present in the polymer composition is highest at the light beam(s) focus, which means background linear absorption is small. At low fluence such materials may be highly optically transparent and exhibit absorbances much less than 1, (e.g. 0.01 to 0.1) in a range between about 300 and about 800 nanometers. Dyes exhibiting RSA properties include porphyrins and phthalocyanines. Porphyrin and phthalocyanine dyes are mentioned here by way of non-limiting example only and a wide variety of other dyes displaying RSA properties are possible.

In one embodiment, the polymer composition employed according to the method of the present invention is an injection moldable thermoplastic polymer composition. In one embodiment, the injection moldable thermoplastic polymer composition is used to injection mold the optically transparent substrate, for example a holographic data storage disc. Conditions of molding may be controlled in such a way so as to produce a molded article comprising a polymer composition comprising a continuous phase and a dispersed phase wherein the dispersed phase is crystalline. Alternatively, conditions of molding may be controlled in such the dispersed phase is amorphous. Copolymers comprising amorphous and crystalline phases are in certain instances well suited for use in injection-moldable thermoplastic polymer compositions used to prepare the optically transparent substrate of the present invention. In one embodiment, a copolymer comprising amorphous and crystalline phases is blended on a roller mill with a reverse saturable dye and the resultant blend is melt extruded and pelletized. The resultant pellets are then injection molded into discs suitable for holographic data storage. An advantage provided by the use of an injection moldable thermoplastic polymer composition is that the stable optically transparent substrate is easily prepared via injection molding and post-processing steps are minimized. In one embodiment, the optically transparent substrate is prepared by injection molding a copolymer composition comprising a light absorbing chromophore such that when the optically transparent substrate is exposed to a holographic interference pattern, the sensitivity of the optically transparent substrate to the holographic interference pattern, the magnitude of the resultant refractive index modulation, and the stability of the stored optically readable datum, may be controlled by proper selection of the copolymeric species present in the copolymer composition. In addition, refractive index modulations larger than those observed for conventional photopolymers are in some instances possible using the method of the present invention. The sensitivity of the optically transparent substrate may in certain embodiments be strongly dependent on the optical absorption properties of the light absorbing chromophore employed. As noted, in one embodiment, the light absorbing chromophore is a reverse saturable absorption dye (an RSA dye). In the case of known reverse saturable absorption dyes, sensitivities as high as 2-3 times those of conventional holographic photopolymers are achievable. The threshold condition also provides the ability to read and write data at a same wavelength with little or no post-processing required after the data is recorded. This is in contrast to photopolymers, which typically require total substrate exposure after recording of data to bring the system to a full cure. Finally, an optically transparent substrate prepared from a thermoplastic polymer composition provides for ease of recycle of scrap material generated during the manufacture of holographic data storage discs as well as post-consumer debris.

Thus, according to an aspect of the present invention, amorphous/crystalline copolymers may be used to support optically induced phase changes and resultant index modulations. Linear absorbing dyes may be used in combination with amorphous/crystalline phase change materials to convert optical energy to temperature increases. Reverse saturable absorption dyes may be used to efficiently generate temperature increases. Optical activation may be separated from index change inducement via the dyes and phase change/separation materials enabling a threshold condition to index change.

By way of further explanation, block copolymers are composed of two or more chemically different polymer chains or blocks joined covalently. Due to chemical incompatibility between the different blocks and the connectivity constraint, certain block copolymers can spontaneously phase-segregate into well-defined morphologies, such as lamellar, cylindrical, spherical, and double gyroid morphologies, providing nanometer scale contrast between the different phases. The resulting morphology, in turn, depends on the relative length and composition of the individual blocks as well as their degree of interaction. This phenomena is discussed by F. S. Bates, and G. H. Fredrickson, *Phys. Today*, (1999), vol. 52, p. 32.

The individual polymers or blocks making up the block copolymer may be semicrystalline and can display amorphous and/or crystalline behavior depending on temperature. Micro-phase separation of such systems can be induced upon a brief (or extended) heating or annealing of the copolymer above the glass transition temperature (Tg) and melting temperature (Tm) of individual blocks. The resulting microphase separated block copolymer is amorphous when the annealing temperature is higher than the melting point of the crystallizable block. Upon cooling to low temperatures, the crystallizable block crystallizes, while maintaining the shapes of the original micro-phases. An example of this phenomenon is illustrated in poly(ethylene)/(styrene-butene) block copolymers as reported by Loo et al. Physical Review Letters (2000), vol. 84, page 4120, where crystallization of the poly(ethylene) block occurs within discrete 25 nm spheres of the microphase separated block copolymer. Confined crystallization in discrete cylindrical domains has also been demonstrated in blends of poly(styrene)/poly(ethylene oxide) and polystyrene homopolymer by Huang et al. in Macromolecules, (2001), vol. 34, page 6649. In one embodiment, diblock copolymers such as 82%18% PS/PEO are particularly well suited for use in holographic data storage. In certain instances the diblock copolymer comprises a relatively high molecular weight monodisperse first polymer chain "A" attached to relatively high molecular weight monodisperse second polymer chain "B". Such a block copolymer may be referred to as an "AB" diblock copolymer. The two blocks are chosen such that polymer A and polymer B are not miscible with one another. Thus, when the diblock copolymer is cast into a film or molded into a thick part, the individual blocks phase separate from one another. However, since the respective polymers are chemically bound to one another, the polymer blocks cannot macrophase separate. Instead, the polymers microphase separate into very small domains and the domain size is determined by the molecular weights of the two individual polymer blocks. The weight ratio of the two blocks can be used to control the geometry of the individual microphases. For example, in a PS/PEO diblock copolymer, where the PEO component is present in an amount corresponding to a weight fraction of less than about 20 wt %, the PEO component (the dispersed phase) will form spheres within the PS continuous phase. Other diblock copolymers useful in the preparation of holographic data storage media according to the present invention include polybutadiene/polyethylene oxide (PB/PEO), and like materials. The PS/PEO and PB/PEO diblock copolymers are commercially available from Polymer Sources, Inc.

For holographic data storage applications, it is useful that the morphology of the block copolymer after microphase separation remains un-changed during further crystallization and/or melting of the block forming the dispersed phase. (The continuous and the dispersed phases are at times also referred to as the majority and minority blocks respectively.) Such a condition can be easily met if the majority block (also referred to as the matrix) is in a glassy or highly cross-linked state during crystallization of the minority block. In other words, it is useful that block copolymers for holographic data storage application are chosen such that the temperature for order-disorder transition of the block copolymer is higher than the glass transition of the matrix-forming block and that the latter is higher than the crystallization and melting temperatures of the block forming the dispersed phase: $T_{order-disorder} > T_{glass}$ (matrix) $> T_{crystallization}$ (dispersed phase) and $T_{melting}$ (dispersed phase). For the PS-PEO block copolymer systems proposed here, $T_{order-disorder} > 250°$ C., Tg (PS)~100° C. and both $T_{crystallization}$ and $T_{melting}$ of PEO are below 100° C. In the case of PB-PEO block copolymer systems, although the glass transition temperature of un-treated polybutadiene can be very low and comparable to the crystallization temperature of PEO dispersed phase, further treatments, such as crosslinking, of the continuous PB phase can be performed to immobilize the matrix chains and thus preserve the morphology established by phase separation.

As noted, the dispersed phase may be present as well defined domains within the continuous phase of the block copolymer, for example as spheres or rods dispersed within the continuous phase. Domain sizes for dispersed phase structures within the continuous phase are dependent upon the molecular weights of the individual blocks, but can range from about 5 nanometers for polymers comprising low molecular weight blocks to about 200 nanometers for polymers comprising high molecular weight blocks. Blends containing at least one block copolymer may exhibit similar relation between the molecular weights of the individual blocks and the domain size of the dispersed phase. For holographic data storage applications, it is useful that the block copolymer forms spherical or cylindrical structures dispersed within the continuous phase. If the minority block comprising the dispersed phase in the diblock copolymer is crystallizable, then nanosize crystals can be formed within the structures of the dispersed phase. Such nanosize crystals present in the dispersed phase of a block copolymer generally have a depressed crystallization temperature relative to a reference homopolymer comprising the same structural units. For example, bulk PEO homopolymer, typically crystallizes between about 30° C. and about 50° C. and melts at about 60° C. In contrast, in PS-PEO block copolymers, the crystallization temperature of the PEO block is depressed to about −30° C. The large change in crystallization temperature (in this example almost 80° C.) of the PEO block is believed to be due to differences between heterogeneous crystallization and homogeneous crystallization. Separation between the crystallization and melting temperatures of the dispersed phase makes certain diblock copolymers especially suitable for holographic data storage. In addition, because of the small size of the nano-cystalline domains, block copolymers comprising a nano-crystalline dispersed phase and an amorphous continuous phase may appear transparent to a human observer, and exhibit minimal Rayleigh light scattering, another important feature.

In one embodiment, a photochemically stable and thermally stable dye, such as a phthalocyanine dye, such as Irgaphor Ultragreen Mx (commercially available from Ciba), copper phthalocyanine, lead phthalocyanine, zinc phthalocyanine, indium phthalocyanine, indium tetra-butyl phthalocyanine, gallium phthalocyanine, cobalt phthalocyanine, platinum phthalocyanine, nickel phthalocyanine, tetra-4-sulfonatophenylporphyrinato-copper(II) or tetra-4-sulfonatophenylporphyrinato-zinc(II) is added to a PS/PEO block copolymer forming a dispersed PEO phase and continuous PS phase. The composition is then injection molded into a 120 mm diameter discs. During the molding process, the block copolymer is subjected to temperatures in excess of the glass transition temperature ($T_g$) of both polystyrene and poly(ethylene oxide) and the melting temperature ($T_m$) of the poly(ethylene oxide), thus producing a molded optically transparent substrate (the 120 mm disc) comprising a polymer composition comprising a continuous PS phase and a dispersed PEO phase, in which both the continuous and the dispersed phases are amorphous, and the domains of the dispersed phase are less than about 200 nm in size. The block copolymer of this example is said to comprise micro-phase separations. Alternatively, low temperature techniques to form films or parts using techniques such as solvent casting or spin coating can be used. These techniques may be used when high temperature injection or compression molding techniques are not amenable for the polymers and/or dyes. Cooling of the disc or film below 100° C., i.e. the glass transition temperature of the polystyrene majority block, freezes the microphase-separated structure. Further cooling of the disc or film to below about −30° C. causes the poly(ethylene oxide) phase to crystallize throughout most of the dispersed phase. For a variety of reasons, within each domain of the dispersed phase, only partial crystallization of the poly(ethylene oxide) chains takes place. This is due to polymer crystal imperfections, limitations of polymer folding, and the fact that crystallization must occur in nanometer-sized domains. In one aspect, the present invention provides a polymer composition comprising a continuous phase and a dispersed phase, said dispersed phase being less than about 200 nm in size wherein both the continuous and dispersed phases comprise a dye, and wherein the dispersed phase is at least partially crystalline. It is demonstrated herein that crystallization of the dispersed phase occurs even in the presence of the dye molecules as will be seen in the examples. In one embodiment, the dispersed phase is crystallized by cooling the optically transparent substrate to low temperature (e.g. −30° C.) and subsequently warming the optically transparent substrate to room temperature. Where the optically transparent substrate comprises a PEO/PS block copolymer, the dispersed PEO phase undergoes crystallization at the low temperature and remains crystalline unless the optically transparent substrate is heated to a temperature above the melting point of the dispersed PEO phase (about 60° C.). Again, where the domain sizes of the crystalline dispersed phase are sufficiently small, (for example less than two hundred nanometers (<200 nm)), the optically transparent substrate will appear transparent to a human observer.

In one embodiment, upon exposure of the optically transparent substrate to one or more recording light beams (e.g., high power laser beams), the light absorbing chromophore present (e.g. a dye) absorbs the intense light at the interference fringes, momentarily raising the temperature in the volume elements of the optically transparent substrate exposed to the interference fringes to a point above the melting temperature (Tm) of the poly(ethylene oxide) phase. In volume elements exposed to the interference fringes of the holographic interference pattern, the crystalline dispersed phase melts and remains amorphous after returning to ambient temperature, producing a refractive index mismatch between the amorphous dispersed phase domains and the crystalline dispersed phase domains which forms the basis of the recorded holographic data as micro-holograms. Subsequent exposure to low energy laser beams for the purpose of reading the recorded micro-holograms and recovering corresponding data as micro-hologram reflections does not cause any substantial change in the material since the holographic data may be read at laser powers that do not heat the dispersed phase above the Tm of the dispersed phase or above the Tg of the continuous phase of the constituent polymer composition. Thus, in one embodiment, a non-linear optically responsive holographic data storage medium is provided that is substantially stable for long periods of time and is not degraded upon reading of the recoded micro-holograms.

While the dispersed phase can be configured as spheres, cylinders and lamellae dispersed in the continuous phase, other structural types are possible. A variety of block copolymers, including polystyrene/polybutadiene, polystyrene/polyethylene, poly(ethylene oxide)/poly(t-butyl methacrylate), poly(ethylene oxide)/poly(methyl methacrylate), poly(ethylene oxide)/polystyrene/poly(ethylene oxide), hydrogenated poly(ethylene)/(styrene-butene) or poly(ethylene)/poly(vinyl cyclohexane), polystyrene/poly(lactic acid), polystyrene/poly(caprolactone), polybutadiene/poly(caprolactone), poly(dimethyl siloxane)/poly(caprolactone), poly(dimethyl siloxane)/Nylon-6 and polycarbonate/polyolefin block copolymers, may alternatively be used and allow for different forming temperatures of the crystalline domains, as well as the temperature at which they are destroyed.

As noted, in certain embodiments, the light absorbing chromophore is a reverse saturable absorber and good control in localizing the heat produced as holograms are written into the optically transparent substrate is achieved. Lateral extension of the micro-holograms may be significantly smaller than the diameter of the waist of the focused laser beam(s). Limiting or eliminating consumption of dynamic range of the recording material outside of the recorded micro-holograms, hence increasing reflectivity of each micro-hologram and therefore data storage capacity, may thus be realized through the use of a non-linear recording medium according to an aspect of the present invention. In one embodiment, the light absorbing chromophore is dissolved in one of the phases, preferably the crystallizable phase. In an alternate embodiment, the light absorbing chromophore is attached to one or more of the blocks of a block copolymer. The block copolymer bearing the light absorbing chromophore may then be molded or otherwise processed (solvent cast, extruded) into an optically transparent substrate within which holographic interference patterns may be recorded and from which optically readable data may be recovered. In one embodiment, "A" represents the fully amorphous block such as PS, "B" represents the crystallizable block such as PEO, and "D" represents a linear or RSA type of dye. The dye molecule "D" can be simply added to the diblock copolymer upon processing, in which case the dye will distribute between the two polymer phases based on its partition coefficient. Functionality can be added to the dye molecule to preferentially cause it to be more soluble in one phase than the other phase. Alternatively, the dye molecule can be attached to the block copolymer in various ways. For instance, a triblock or multiblock copolymer can be formed of the type "ABD" or "DBABD". In one embodiment, the dye molecule will concentrate in the center of the "B" phase, a multiblock copolymer. In an alternate embodiment, the dye molecule forms a shell around the B-phase. In one embodiment, the polymer composition used to prepare the optically transparent substrate is a multiblock copolymer of the type "ADB" or "BDADB" containing a dye, and wherein the dye is concentrated near the interface between the "A" and "B" phases. In another embodiment, an "A"-type homopolymer end-capped with a light absorbing chromophore "D" (represented here as "AD") is blended with a an "AB" type block copolymer to form a blend composition from which the optically transparent substrate may be prepared. Depending on the affinity of the light absorbing chromophore for the "A" block or "B" block constituents the light absorbing chromophore "D" may concentrate in the "A" block phase, the "B' block phase, or be concentrated at the interface between the "A" block phase, the "B' block phase of the polymer composition. In an alternate embodiment, the polymer composition comprises an "AB" block copolymer having a dispersed phase and a continuous phase, an "A"-type homopolymer end-capped with a light absorbing chromophore "D" (represented here as "AD"), and a "B"-type homopolymer end-capped with a light absorbing chromophore "D" (represented here as "BD") wherein the light absorbing chromophore "D" is concentrated at the interface between the continuous phase and the dispersed phase, is concentrated in the continuous phase, or is concentrated in the dispersed phase.

Figure 12:
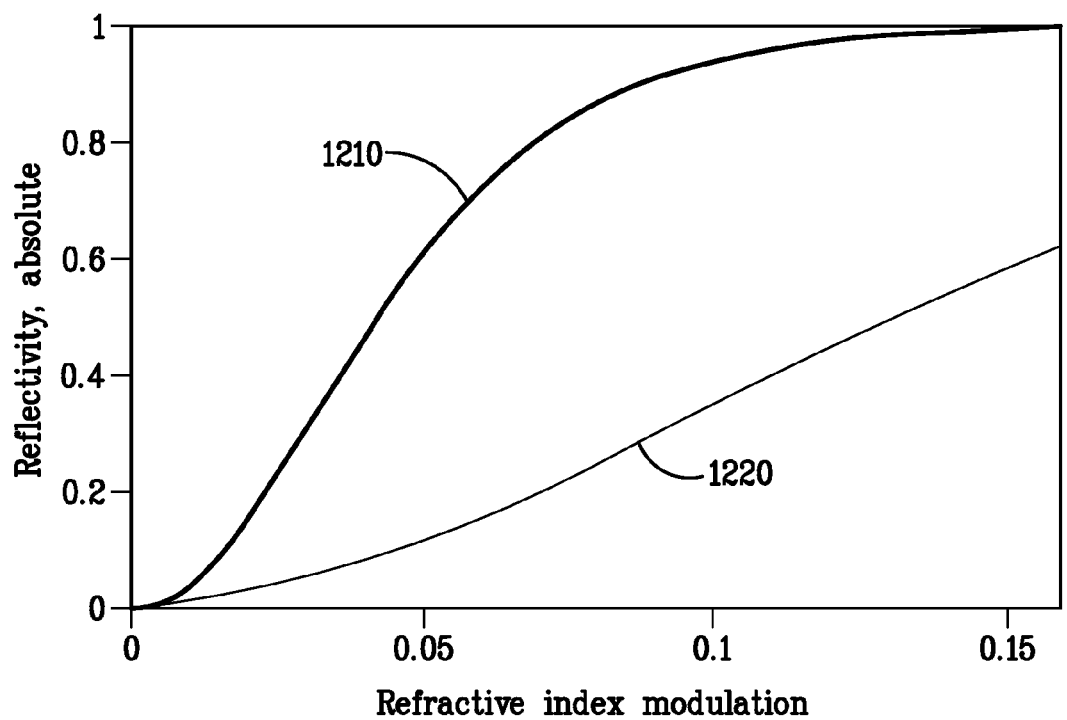
FIG. 12 illustrates an expected micro-hologram reflectivity as a function of refractive index modulation.

As noted, the polymer compositions used according to the method of the present invention represent in certain embodiments threshold materials which exhibit enhanced hologram recording characteristics relative to other polymer compositions. Enhanced hologram recording characteristics include higher achievable recording data rates for a micro-holographic system. In certain instances, the step-wise refractive index modulation resulting from a threshold characteristic of the holographic data storage medium may produce micro-holograms which are less reflective than micro-holograms recorded in linearly responsive materials. However, reflectivity remains sufficiently high for data storage applications. Referring now also to FIG. 12, it is expected that reflectivity will increase with increasing refractive index modulation. In one embodiment, the effect of thermal diffusion during hologram formation is controlled such that only the volume elements exposed to the holographic interference pattern reach the threshold temperature required to effect a phase change. To maintain the fringes in the index pattern, thermal diffusion may be substantially limited to the region between the fringes reaching the phase change temperature. Curve 1210 in FIG.

Figure 13A:
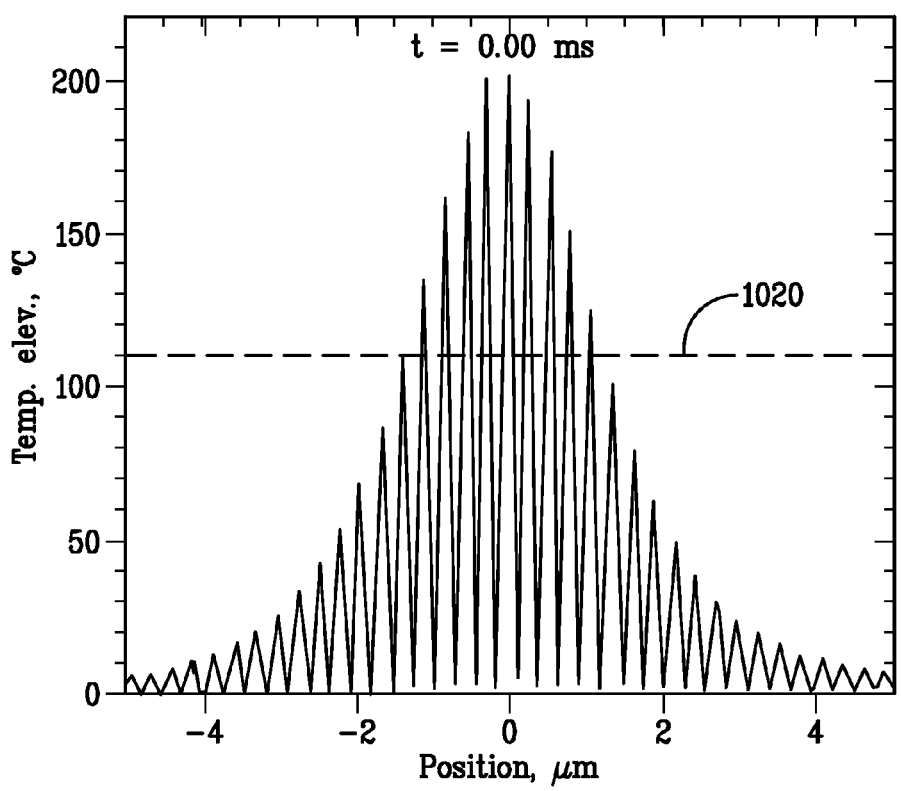
FIGS. 13A and 13B illustrate expected temperature elevation profiles as a function of position, at various times.
Figure 13B:
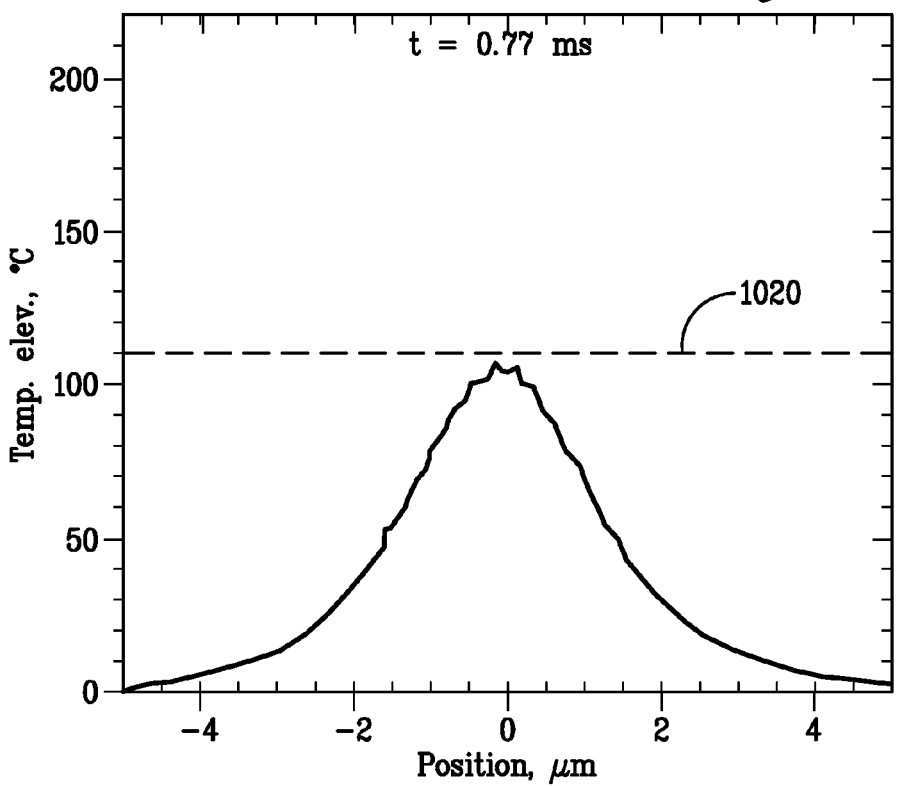

12 corresponds to a linearly responsive material, and curve 1220 in FIG. 12 corresponds to a threshold responsive material. Referring now also to FIGS. 13A and 13B, there are shown expected temperature elevation profiles as a function of position. Accordingly, it is expected that thermal leakage from a target volume to surrounding volumes should not raise the surrounding volumes to the threshold temperature 1020.

Figure 17:
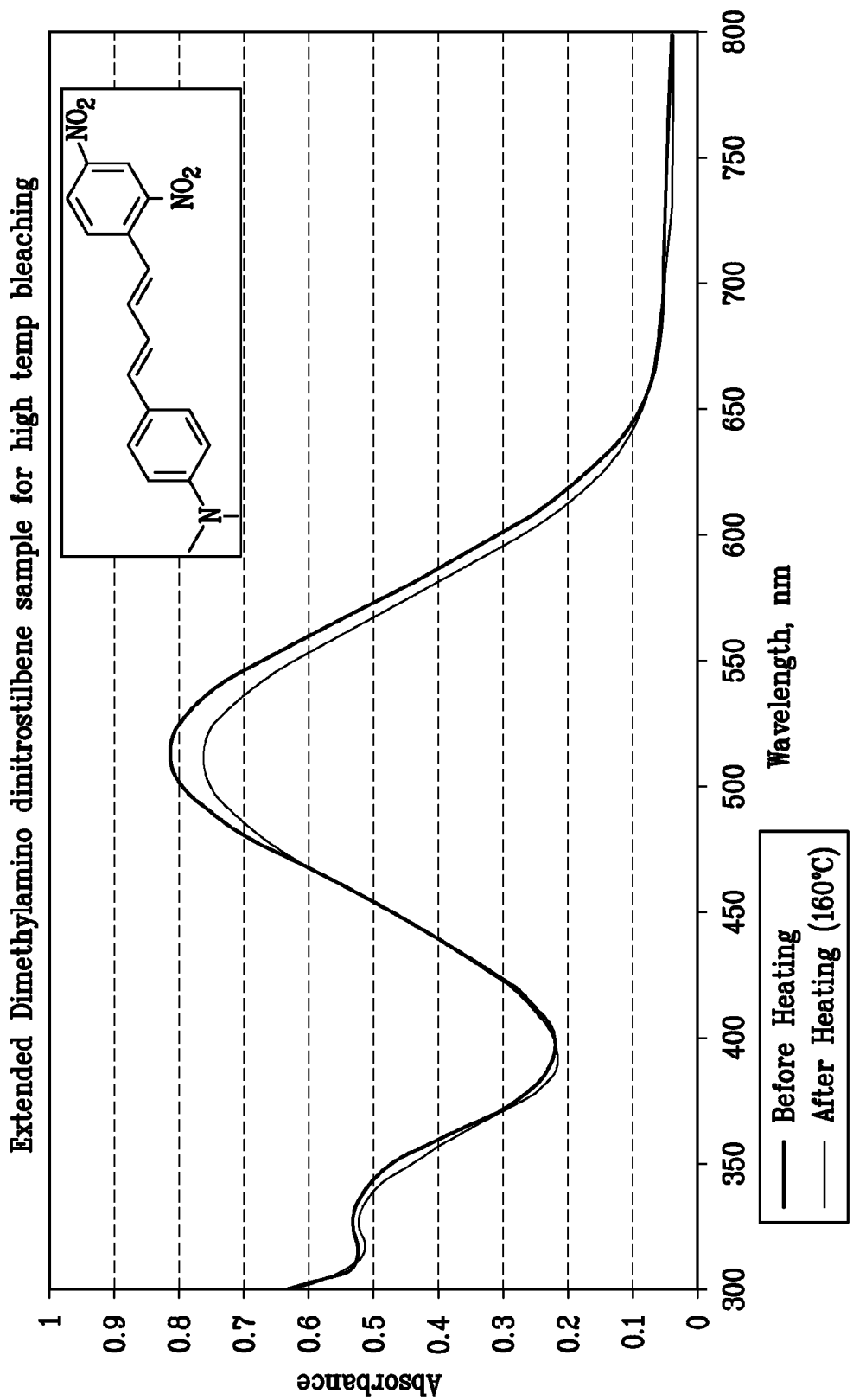
FIG. 17 illustrates the absorbance of dimethylamino dinitrostilbene as a function of wavelength at 25° C. and 160° C.

As noted, a variety of light absorbing chromophores may be employed using the method of the present invention. In one embodiment, the light absorbing chromophore is a dye which is thermally and photochemically stable. By thermally and photochemically stable it is meant that the dye does not undergo significant transformation upon exposure to the holographic interference pattern during recording and is also not degraded as the recoded holographic data is read by a read beam. In general then, the thermally and photochemically stable dye undergoes less than 1% degradation during exposure of the optically transparent substrate to the holographic interference pattern during the recording step. In another embodiment, the thermally and photochemically stable dye undergoes less than 0.25% degradation during exposure of the optically transparent substrate to the holographic interference pattern during the recording step. In yet another embodiment, the thermally and photochemically stable dye undergoes less than 0.1% degradation during exposure of the optically transparent substrate to the holographic interference pattern during the recording step. Reverse Saturable Absorbers (RSA), also known as excited state absorbers, are particularly attractive. These include a variety of metallophthalocyanines and fullerene dyes that typically have a very weak absorption in a portion of the spectrum well separated from other strong absorptions of the dye, but nonetheless exhibit robust transient triplet-triplet absorption when the intensity of the light surpasses a threshold level. Data corresponding to a non-limiting example using extended dimethylamino dinitrostilbene is shown in FIG. 17. Consistently therewith, it is expected that once an intensity of light at interference fringes of counter-propagating light beams in a medium incorporating dimethylamino dinitrostilbene surpasses the threshold level, the dye absorbs strongly at a focused point and can quickly heat the corresponding volumes of the material to high temperatures. Thus, according to an aspect of the present invention, a thermal gating event is used to enable a relatively low energy to write data into target volume elements of the optically transparent substrate, while minimizing undesired exposure induced changes in non-target volume elements.

As noted, the optically transparent substrate comprises a polymer composition which may be a copolymer composition or a blend composition, said polymer composition comprising a continuous phase and a dispersed phase, said dispersed phase being less than about 200 nm in size, meaning that the longest path length across domains of the dispersed phase are on average less than about 200 nm in length, and a light absorbing chromophore. The optically transparent substrate may comprise any plastic material having sufficient optical quality, e.g., low scatter, low birefringence, and negligible losses at the wavelengths of interest, to render the data in the holographic storage material readable. Organic polymeric materials, such as for example, oligomers, polymers, dendrimers, ionomers, copolymers such as for example, block copolymers, random copolymers, graft copolymers, star block copolymers; and the like, or a combination comprising at least one of the foregoing polymers can be used. Thermoplastic polymers or thermosetting polymers can be used. Examples of suitable thermoplastic polymers include polyacrylates, polymethacrylates, polyamides, polyesters, polyolefins, polycarbonates, polystyrenes, polyesters, polyamideimides, polyaromaticates, polyaromaticsulfones, polyethersulfones, polyphenylene sulfides, polysulfones, polyimides, polyetherimides, polyetherketones, polyether etherketones, polyether ketone ketones, polysiloxanes, polyurethanes, polyaromaticene ethers, polyethers, polyether amides, polyether esters, or the like, or a combination comprising at least one of the foregoing thermoplastic polymers. Some more possible examples of suitable thermoplastic polymers include, but are not limited to, amorphous and semicrystalline thermoplastic polymers and polymer blends, such as: polyvinyl chloride, linear and cyclic polyolefins, chlorinated polyethylene, polypropylene, and the like; hydrogenated polysulfones, ABS resins, hydrogenated polystyrenes, syndiotactic and atactic polystyrenes, polycyclohexyl ethylene, styrene-acrylonitrile copolymer, styrene-maleic anhydride copolymer, and the like; polybutadiene, polymethylmethacrylate (PMMA), methyl methacrylate-polyimide copolymers; polyacrylonitrile, polyacetals, polyphenylene ethers, including, but not limited to, those derived from 2,6-dimethylphenol and copolymers with 2,3,6-trimethylphenol, and the like; ethylene-vinyl acetate copolymers, polyvinyl acetate, ethylene-tetrafluoroethylene copolymer, aromatic polyesters, polyvinyl fluoride, polyvinylidene fluoride, and polyvinylidene chloride.

In some embodiments, the optically transparent substrate comprises a polymer composition comprising a polycarbonate. The polycarbonate may be an aromatic polycarbonate, an aliphatic polycarbonate, or a polycarbonate comprising both aromatic and aliphatic structural units.

The polymer composition used to prepare the optically transparent substrate may comprise other additives such as heat stabilizers; antioxidants; light stabilizers; plasticizers; antistatic agents; mold releasing agents; additional resins; binders, blowing agents; and the like, as well as combinations of the foregoing additives.

Generally, the polymer composition comprising the optically transparent substrate should be capable of withstanding the processing conditions used to prepare the holographic data storage medium, for example during steps in which the polymer composition is molded into a holographic data storage disc.

In one embodiment the polymer composition is injection molded to form an article (the optically transparent substrate) that can be used for producing holographic data storage media. The injection-molded article can have any geometry. Examples of suitable geometries include circular discs, square shaped plates, polygonal shapes, or the like. The thickness of the articles can vary, from being at least 100 micrometers in an embodiment, and at least 250 micrometers in another embodiment. A thickness of at least 250 micrometers is useful in producing holographic data storage disks that are comparable to the thickness of current digital storage discs.

The molded data storage medium thus produced can be used for producing data storage articles, which can be used for storing data in the form of holograms. The data storage medium in the data storage article is irradiated with a holographic interference pattern having a first wavelength to record at least one optically readable datum. The optically readable datum is stored as a hologram patterned within at least one volume element of the data storage medium.

The methods disclosed herein can be used for producing holographic data storage media that can be used for bit-wise type data storage in an embodiment, and page-wise type storage of data in another embodiment. In still another embodiment, the methods can be used for storing data in multiple layers of the data storage medium.

In another embodiment, the present invention provides a data storage medium comprising polymer composition comprising a continuous phase and a dispersed phase wherein the domains of the dispersed phase are less than about 200 nm in size, and a light absorbing chromophore. In yet another embodiment, the present invention provides a data storage medium having at least one optically readable datum stored therein, the data storage medium comprising a polymer composition, said polymer composition comprising a continuous phase and a dispersed phase, said dispersed phase being less than about 200 nm in size, and a light absorbing chromophore wherein the at least one optically readable datum is stored as a hologram in the data storage medium.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

EXPERIMENTAL SECTION

Example 1

A 2% solution of polystyrene (Mw of 125-250 k) was prepared by dissolving 25.8 mg of polymer with 1.5 ml of benzene. The solution was filtered through a 0.45 um filter and the entire sample was poured onto a 50 mm silicon wafer and spin coated at 1500 rpms for 60 seconds. The solvent was further removed by drying the sample in a vacuum oven for approximately 2 hours. The coated wafer was then diced into smaller pieces to yield 1-2 cm$^2$ samples. Three of these diced samples were annealed at 120° C. for 2.5 hours to raise the polymer above its Tg, remove any residual solvent, and relieve stresses that may of occurred during spin coating. The thickness and refractive index (RI) of these 3 samples were measured with a spectroscopic ellipsometer. Although the RI and changes in the RI are only recorded at 589.9 nm for these examples, the changes or lack of change in RI observed were the same across a variety of wavelengths, including the region from 399.4 nm to 589.9 nm. The sample to sample thickness varied slightly from 112 to 115 nm, but the RI was very consistent (1.589, 1.590, and 1.589). Two of the samples were cooled to –40° C. overnight and the RI was re-measured in the same locations on each sample and were found to be unchanged (1.589 and 1.589 compared to the 1$^{st}$ and 3$^{rd}$ samples above). The 2 samples were then heated on a hot plate for 5 min at 85° C. and after cooling back to room temperature, the RI's were measured and found to be essentially unchanged. Heating to 85° C. was repeated with the same observation that no change in RI occurred (1.588 and 1.589). Thus, this experiment confirms that the refractive index of amorphous polystyrene remains unchanged over temperature oscillation of 120° C. to –40° C., and back to 85° C.

Example 1 illustrates the suitability of polystyrene as an amorphous continuous phase since it does not crystallize at low temperature and the refractive index of amorphous polystyrene remains unchanged over a wide temperature range.

Example 2

A sample of a PS/PEO diblock copolymer containing ~18 wt % PEO (dispersed phase) PS (continuous phase) and having Mw's of 51 k for the PS and 11.5 k for the PEO blocks was obtained from Polymer Source, Inc. Samples were prepared as in Example 1 by spin coating 2% solutions of the block copolymer on the silicon wafer and annealing at 120° C. for 12 hours. After annealing, the diced samples were cooled to room temperature. The annealing process involved heating the polymers above the glass transition temperature of PS (100° C.) and melting point of the PEO (>60° C.) while remaining below the order-disorder transition of the block copolymer (250°). Although the coating of the block copolymer was initially a single phase, annealing the samples in this manner results in phase separation of the blocks, which remain separated upon cooling back to room temperature. The thickness of these samples varied from 143 nm to 157 nm, but the RI's were quite consistent (1.584, 1.584, and 1.583). Freezing two of the samples at –40° C. and remeasuring the RI showed an average increase in RI of 0.005 to 1.589. Upon re-heating of the sample to 85° C. for 5 minutes, a decrease in RI back to nearly the original RI (actual: 1.583) was observed. This increase in RI upon freezing the samples and subsequent decrease in RI back to the original by heating the sample above the melting point of the PEO but below the Tg of PS shows that crystallization of the PEO in the dispersed phase increases the RI and melting of the PEO in the dispersed phase lowers the RI. Subsequent examples will show that the PEO amorphous and crystalline domains have been verified in these samples.

Example 2 illustrates the suitability of polystyrene-poly (ethylene oxide) block copolymers for use as the polymer composition according to the method of the present invention.

Example 3

A second set of experiments were done with the same diblock copolymer used in Example 2 to demonstrate the threshold nature of the material. The samples were prepared and frozen as in Example 2. In this example, the frozen samples which had been allowed to warm to room temperature were again measured with the ellipsometer and showed an RI increase of ~0.005 compared with the annealed samples. The sample was then heated on a hot plate for 5 minutes at 50° C. and the RI recorded. This measurement was repeated after heating to 65° C., and in both cases no change in RI was recorded by the ellipsometer. However, heating this same sample to 85° C. and 100° C. for 5 minute durations did once again lead to a decrease in RI of 0.005 in both cases. Thus, one RI was maintained for the material until the sample was heated above a threshold condition (the melting point of the PEO), which then caused an RI change. Temperatures recorded here are for the surface of the hot plate and the actual temperature of the sample may have actually been slightly lower.

Example 3 illustrates the suitability of PS-PEO block copolymers for use as threshold response materials according to one aspect of the present invention.

Example 4

Two PS/PEO diblock copolymers containing ~20 wt % PEO (dispersed phase) in a continuous phase of PS and having PS/PEO Mw's of 51 k/11.5 k and 227/61K were obtained from Polymer Source, Inc. A sample of PEO homopolymer having a molecular weight of 11K was also obtained from Polymer Source, Inc. 2 wt % solutions of the block copolymers and the homopolymer in benzene were solvent cast in differential scanning calorimetry (DSC) aluminum sample pans. Samples were subjected to vacuum at room temperature overnight to remove any residual solvent.

The first series of DSC experiments were conducted by heating the samples from room temperature to 150° C. at a constant rate of 10° C. per minute. A close inspection of the heat flow curve for the PS-PEO block copolymers reveals only the glass transition of PS matrix in the vicinity of 100° C. The dispersed phase of the PEO block was judged to be amorphous since no melting transition was observed for the for the block copolymer samples. A PEO homopolymer reference sample exhibited an obvious melting transition at 60° C.

Figures 3A, 3B:
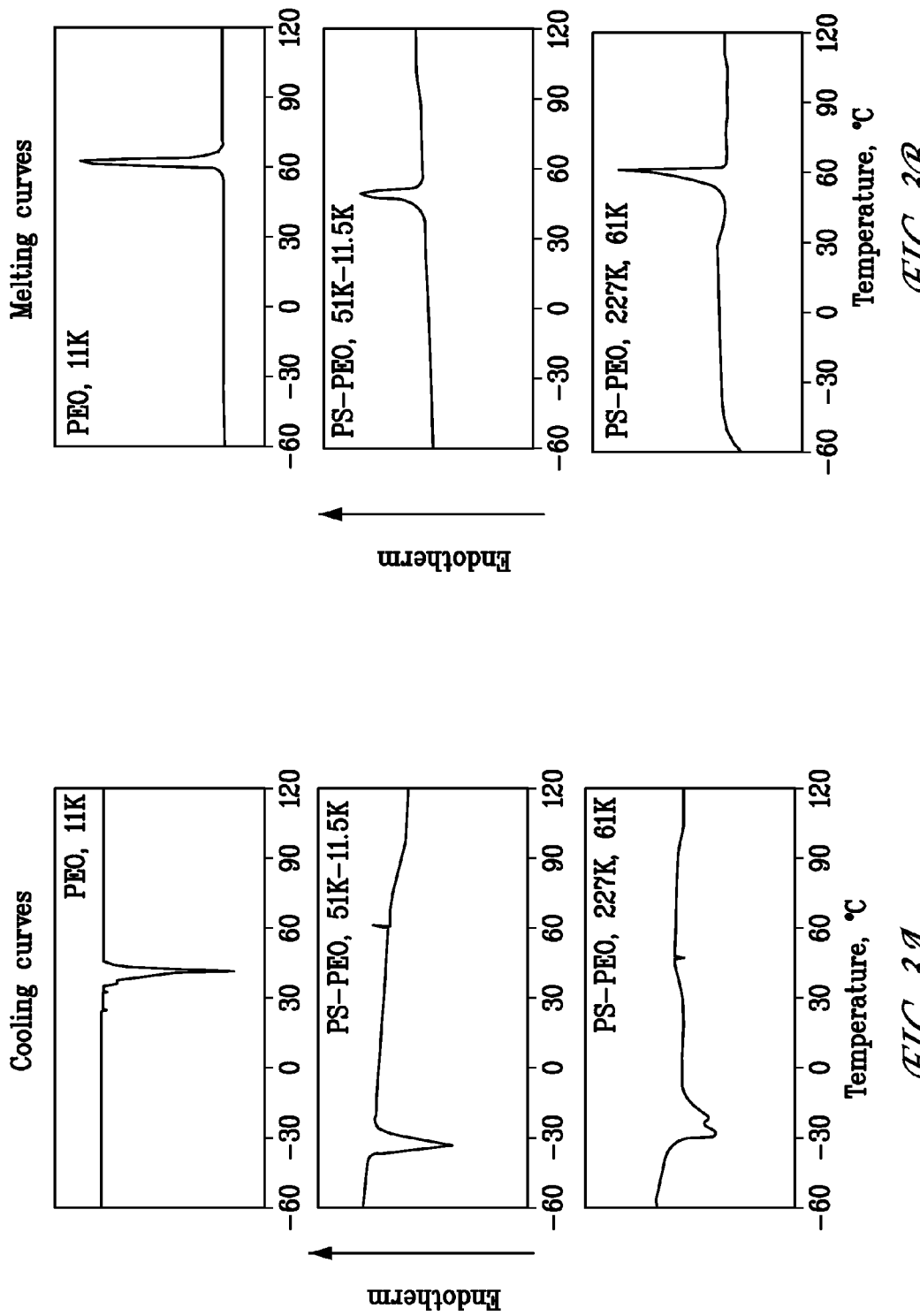
FIG. 3A illustrates a series of cooling curves associated with confined nanocrystallization in PS-PEO block copolymers and bulk crystallization in PEO homopolymers.
FIG. 3B illustrates a series of melting curves associated with melting of PEO crystals in homopolymer and copolymer systems.

In a second series of experiments, samples were kept at 150° C. for at least 5 minutes and then cooled down to −80° C. at a constant rate of 10° C./min while recording the heat flow behavior. A comparison between confined nano-crystallization in PS-PEO block copolymers and bulk crystallization in PEO homopolymer reveals a drastic difference/depression (about 72° C.) of crystallization temperature in the confined crystallization case (see cooling curves FIG. 3a. The DSC heating scans of all samples subsequent to crystallization at a constant rate of 10° C./min is shown in FIG. 3b where melting of PEO crystals in both homopolymer and copolymer systems can be observed. Despite the dramatic difference in the crystallization temperatures, the melting of PEO crystals in both cases takes place in a very similar range. The area under the melting curve represents the heat of fusion of these crystals. The volume fraction of crystalline PEO can be estimated by the dividing the measured heat of fusion by the heat of fusion of 100% crystalline PEO, $\Delta H^0 = 200$ J/g). The volume fractions of PEO crystals in the homopolymer, PS-PEO 51 k-11.5K and 227-61 k are equal to 0.89, 0.51 and 0.65, respectively.

The index of refraction of PS-PEO block copolymers can be simply estimated according to: $<n(PS-PEO)> = \omega_{PEO} n_{PEO} + (1-\omega_{PEO}) n_{PS} +$. Where $\omega_{PEO}$, $n_{PEO}$, $n_{PS}$ are the volume fraction of PEO in the block copolymer and the indices of refraction of PEO and PS, respectively. The index of refraction of amorphous PS domains is constant and equal to 1.590. In contrast the index of refraction of PEO domains depends on whether the PEO chains are crystalline or amorphous: $n_{PEO} = \alpha \cdot n^c_{PEO} + (1-\alpha) n^a_{PEO}$, where $\alpha$ is the degree of crystallinity and $n^c_{PEO}$ and $n^a_{PEO}$ are the indices of refraction of purely crystalline and purely amorphous PEO, respectively. The relative change in the index of refraction of a PS-PEO block copolymer before and after crystallization can then be expressed as $\Delta n = <n(PS-PEO)>_{crystalline} - <n(PS-PEO)> = \alpha \omega_{PEO}(n^c_{PEO} - n^a_{PEO})$. For instance, if $n^c_{PEO} = 1.507$ (experimentally determined through spectroscopic ellipsometry measurements) and $n^a_{PEO} = 1.456$ (ref. Ingham et al. Journal or Polymer Science (1965), vol. 3, page 2707), then the estimated $\Delta n$ for the PS-PEO (51K-11.5K) block copolymer before and after crystallization is equal to 0.047, where the volume fraction of PEO and the degree of crystallinity are equal to 0.18 and 0.51, respectively. The estimated value of □n (based on degree of crystallinity) is in very good agreement with the experimentally determined value of $\Delta n$ in example 3.

Example 5

Figure 4:
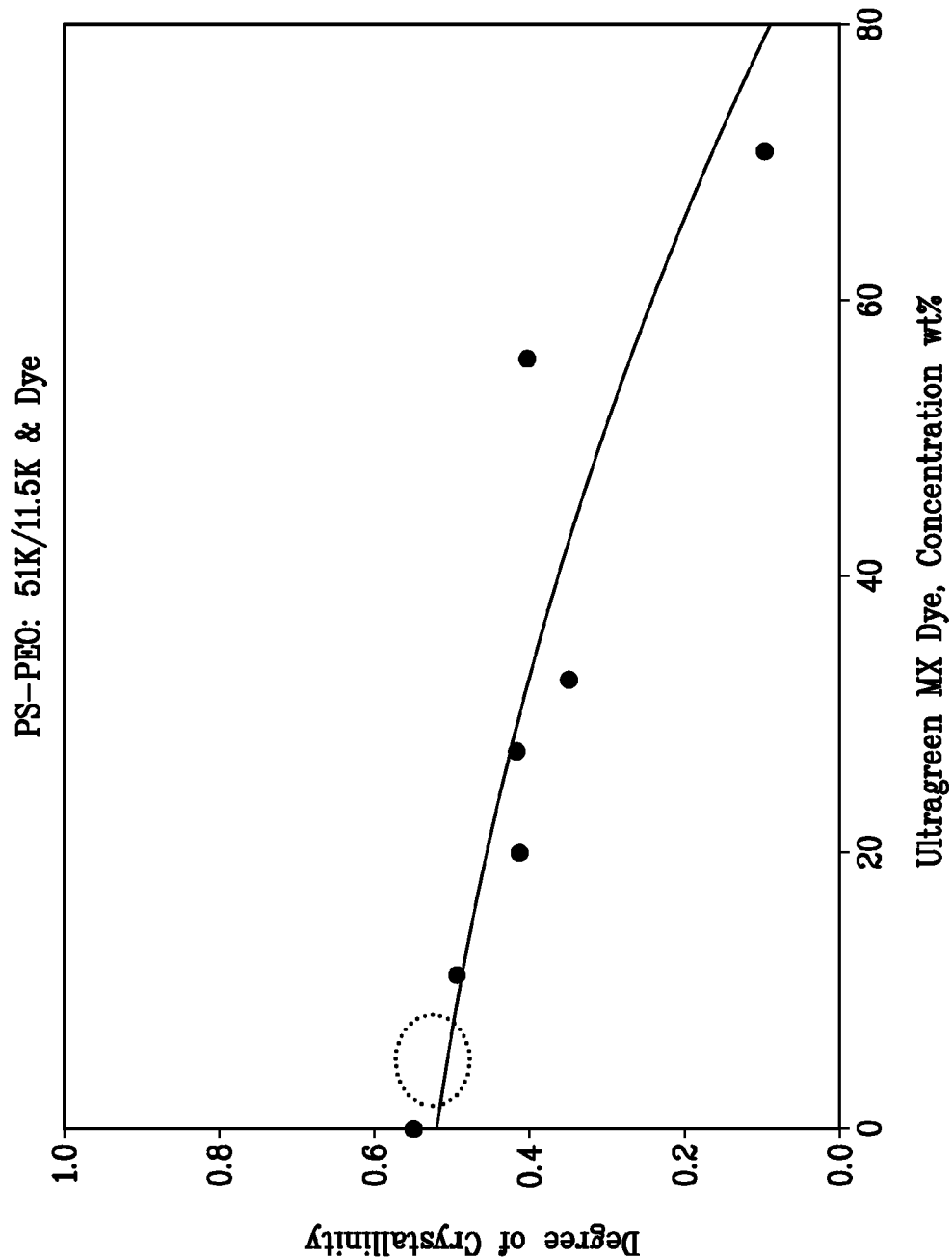
FIG. 4 is a graph depicting the degree of crystallinity in a PS/PEO diblock copolymer and Irgaphor Ultragreen MX dye mixture as a function of mixture concentration.

A PS/PEO diblock copolymer containing ~18 wt % PEO with PS and having PS/PEO Mw of 51 k/11.5 k was obtained from Polymer Source, Inc. Mixtures of this block copolymer and Irgaphor Ultragreen MX dye (commercially available from Ciba) were prepared wherein the dye concentration was varied between 0.25 wt % and 71 wt %. 2 wt % solutions of these mixtures in benzene were solvent cast in special aluminum pans designed for differential scanning calorimetry (DSC). Samples were subjected to vacuum at room temperature overnight to remove any residual solvent. DSC cooling and heating scans similar to those described in example 4 were performed on these mixtures. A drastic depression (about 75° C.) of crystallization temperature was again observed in these block copolymer/dye mixtures confirming the confined crystallization of PEO crystals. As was observed for the pure block copolymer in Example 4, melting of the PEO crystals was observed at about 60° C. A systematic reduction of the heat of fusion of PEO crystals as a function of dye concentration is was also observed. As in Example 4, the degree of crystallinity in the mixtures was estimated and is plotted in FIG. 4. For mixtures containing dye concentrations larger than about 30 wt %, a systematic reduction of crystallinity was observed. For holographic data storage applications, a useful range of dye concentration is between 0.25 and 1 wt %. In this concentration range, which has been circled in FIG. 4, the reduction in degree of crystallinity of PEO is negligible for holographic data storage applications.

Example 5 illustrates the suitability of polystyrene as an amorphous continuous phase since it does not crystallize at low temperature. Similar ellipsometry experiments carried out on block copolymer samples containing an RSA dye suggest that, within broad ranges, the dye structure does not interfere with the creation of RI changes based on phase changes of the dispersed phase.

Example 6

Figures 5A, 5B:
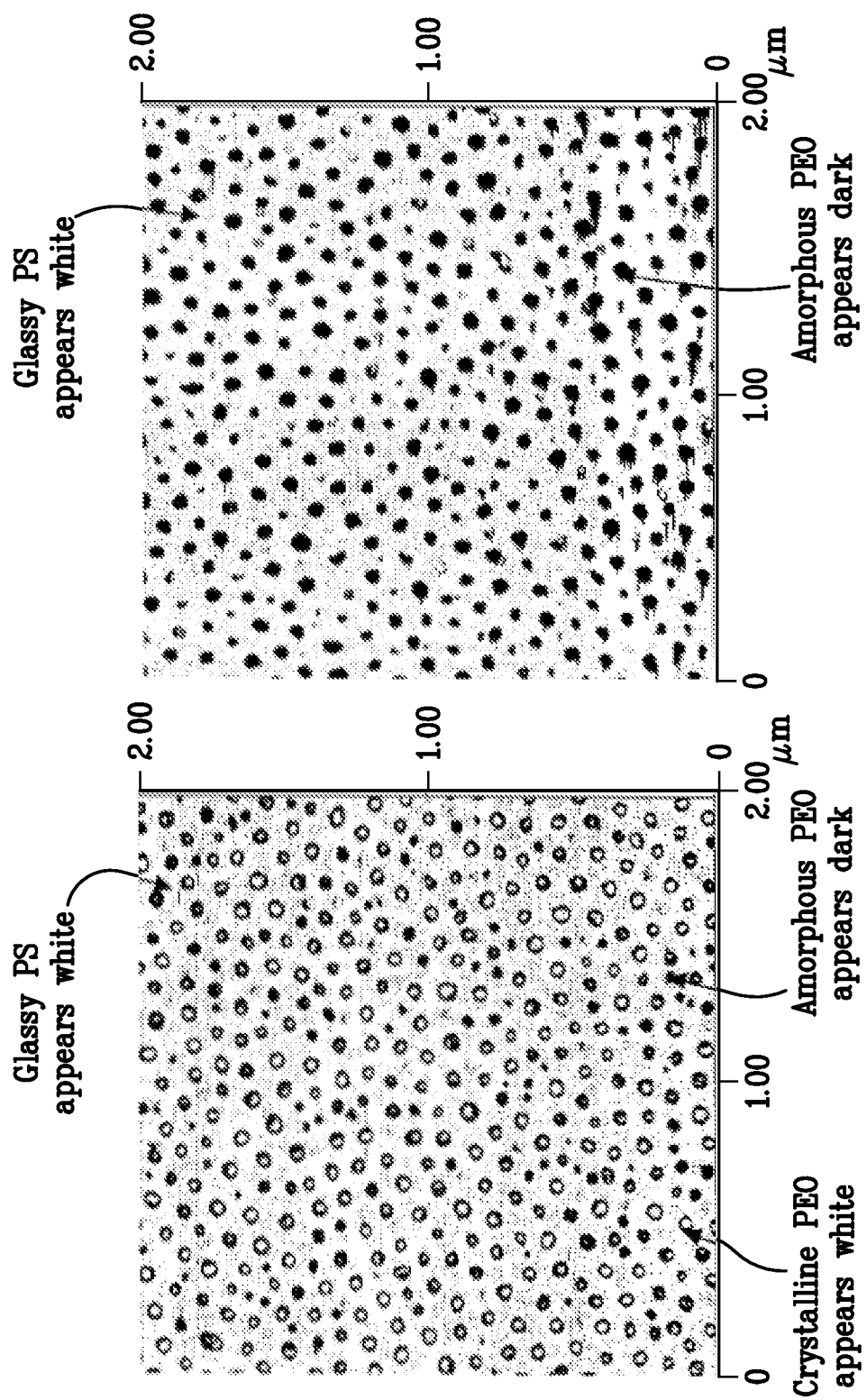
FIG. 5A shows a tapping mode atomic force microscopy (AFM) phase image of a PS-PEO block copolymer sample subsequent to self-assembly and crystallization of PEO domains.
FIG. 5B shows a tapping mode atomic force microscopy phase image of the sample after treatment at 60° C.

A sample of a PS/PEO diblock copolymer containing ~21 wt % PEO and having Mw's of 227 k for the PS and 61 k for the PEO blocks was obtained from Polymer Source, Inc. A 2 wt % solution of this block copolymer in benzene was spin coated at 1500 rpms for 60 seconds. Samples were subjected to vacuum at room temperature overnight to remove any residual solvent. During spin coating, phase separation of PS-PEO takes place. Samples were then annealed at 50° C. for at least 2 hours. FIG. 5a shows a tapping mode atomic force microscopy (AFM) phase image of the PS-PEO block copolymer subsequent to self-assembly and crystallization of PEO domains. In AFM phase imaging, the contrasts between mechanical properties of different regions of the samples are probed. In FIG. 5a, glassy PS matrix as well as the amorphous and crystalline PEO regions are highlighted. Upon heating of these samples at 60° C. for 5 minutes, melting of PEO nanocrystals takes place. FIG. 5b shows a tapping mode atomic force microscopy phase image of the sample after treatment at 60° C. As it can be in this figure, the spherical morphology of the PS-PEO block copolymer is preserved upon heating. However, only "soft" amorphous PEO regions can be detected in the phase image. The transition between amorphous and crystalline phases in this PS-PEO block copolymer is fully reversible. EXAMPLE 7

A stock solution of Irgaphor Ultragreen MX was prepared containing 1.87 mg of dye/ml of toluene. A solution suitable for spin casting was prepared by dissolving 0.250 grams of monodisperse PS (available from Pressure Chemical having a Mw of 61 k) with 334 uL of the stock dye solution and 666 uL of pure toluene, producing a 25 wt % solution of polymer in toluene with 0.25 wt % dye relative to the polymer. Spin casting was done at 2000 rpm's for 60 seconds on small samples of silicon wafers (1-2 cm²) and glass slides to produce thin films approximately 3.2 um thick. Samples were annealed at 150° C. overnight to remove traces of solvent, reduce stresses created during spin casting, and to expose the polymer and RSA dye to an initial thermal history. UV-Vis spectroscopy after the annealing process on the glass slides showed the RSA dye was fully intact in the polymer matrix.

Figure 6:
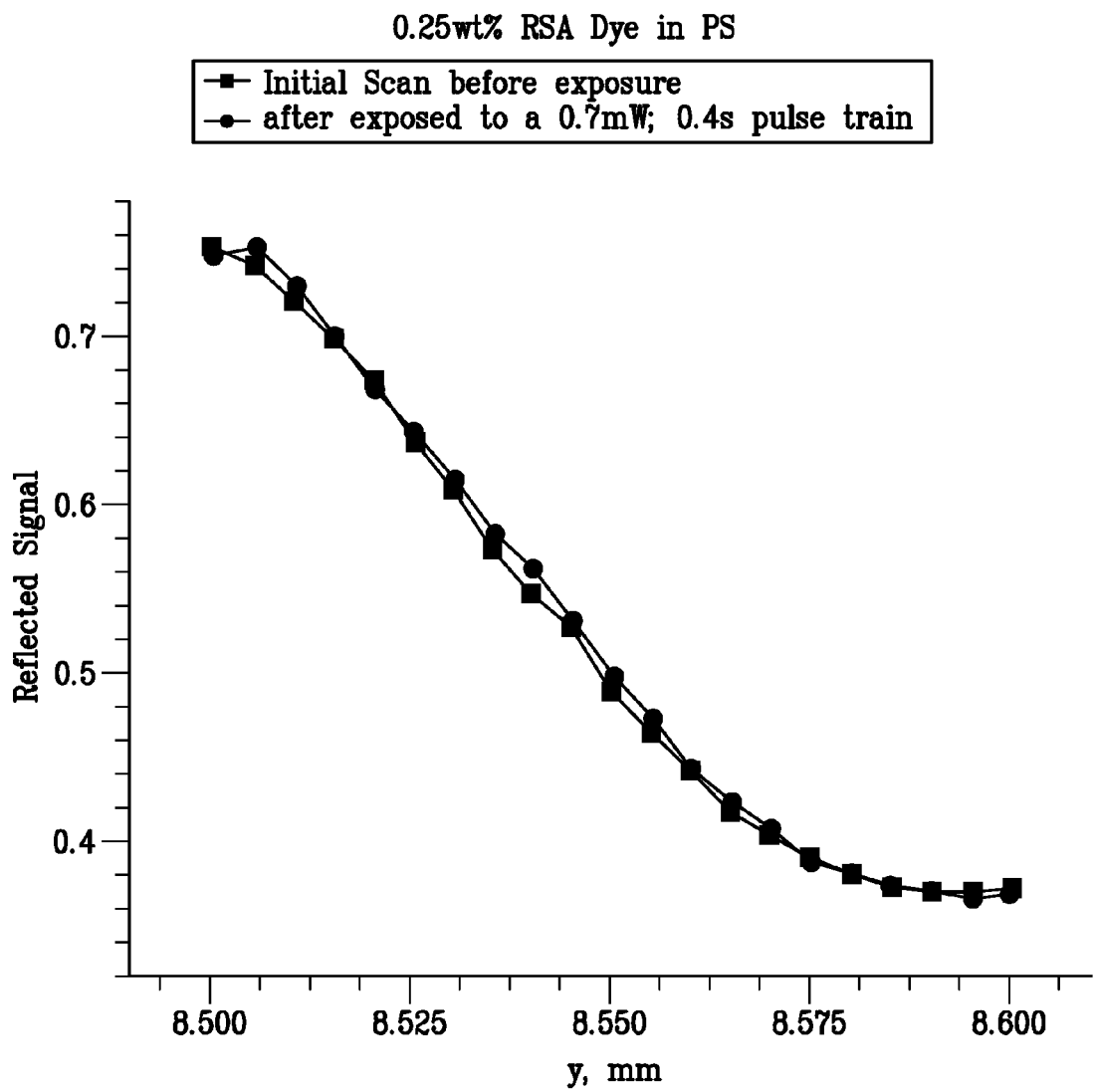
FIG. 6 depicts curves illustrating reflected signals for an RSA dye doped PS film before and after exposure to a green pulse train.

Light induced refractive index change of the sample was measured in 3 steps. First, the sample profile was probed over a 100 um region using a focused continuous-wave (CW) 633 nm red He—Ne laser beam. Reflected interference signal from the sample was recorded when the sample was moved perpendicular to the red beam along its focal plane. Second, the sample was moved to the mid-point of the recently probed 100 um region and was then exposed to a dose of focused (15 um focal size) green laser pulses in order to create local heating of the sample and to potentially create a change in the refractive index of the sample. The green pulses came from a Q-switched frequency doubled 523 nm laser. The pulse width was 20 ns. The repetition rate was 1.5 KHz. External attenuators were used to adjust the pulse energy. A mechanical shutter was used to control the exposure time. Last, after the exposure, the sample was probed over the same 100 um region using the same method as in the first step, and the reflected interference signals were recorded. By comparing the signals obtained before and after the exposure, the light induced change of the sample was revealed. Note that the shape of the curves in the various graphs are different as a result of surface and bulk polymer variations from spot to spot. Localized changes in RI caused by melting of the PEO will simply cause the curve to change as light is reflected differently through the polymer after the RI changes. The 0.25 wt % RSA dye doped 3.2 um thick PS film was exposed to a green pulse train of 0.7 mW at 1.5 KHz repetition rate for 0.4 seconds. No changes signifying a RI change were measured from the reflected signals before and after the exposure as shown in FIG. 6.

Example 8

Figure 7:
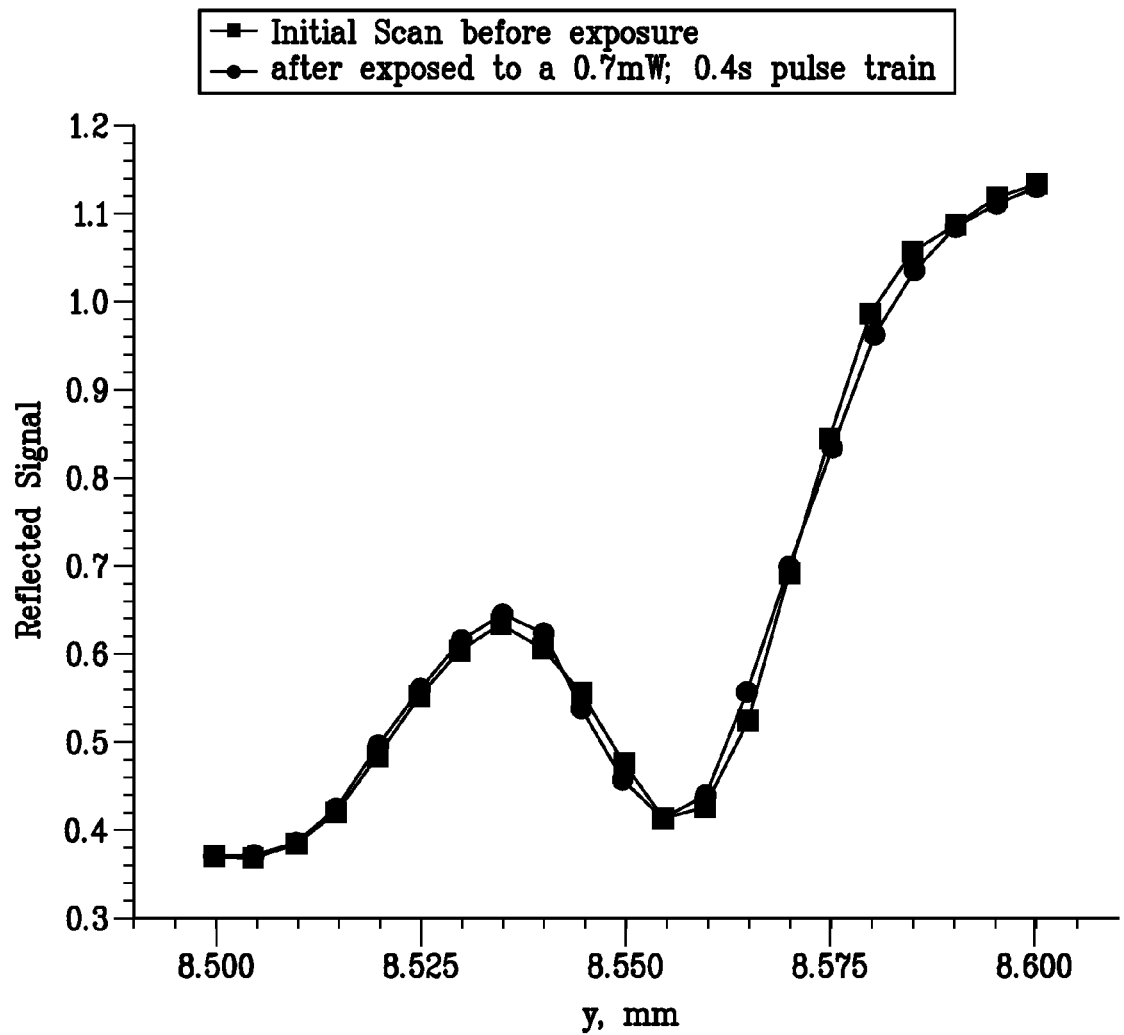
FIG. 7 depicts curves illustrating reflected signals for an RSA dye doped PS/PEO film before and after exposure to a green pulse train.

Samples were prepared in a similar manner as example 8 using PS/PEO diblock copolymers that had an overall Mw comparable to the PS samples (PS/PEO of 51 k/11.5 k respectively). All of the samples were annealed at 150° C. for 14 hours to affect phase separation and insure both the PS and PEO phases were amorphous. Samples of these amorphous diblock copolymers containing RSA dye were tested using the same method as in Example 8. Using the same exposure condition of 0.7 mW at 1.5 KHz repetition rate for 0.4 s, no changes signifying a RI change were measured from the reflected signals when comparing the before and after the exposure as shown in FIG. 7. Confirming that localize heating of the fully amorphous polymer system caused no change in RI.

Example 9

Figure 8A:
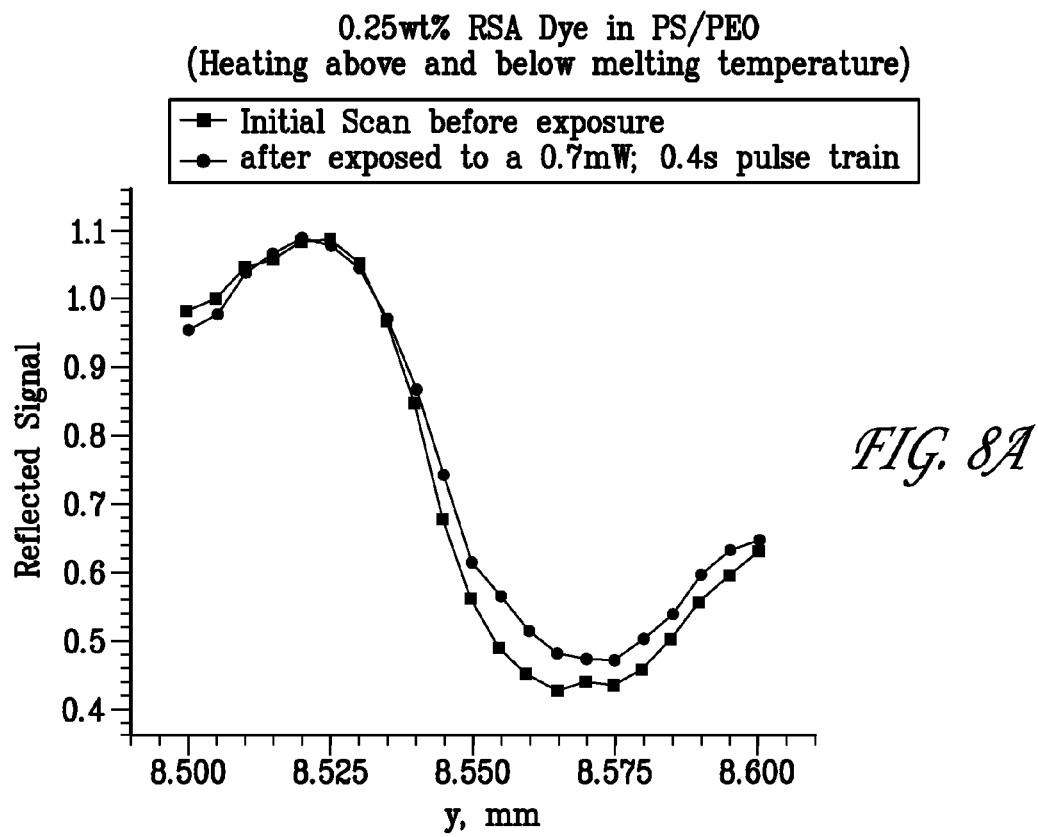
FIGS. 8A and 8B depict curves illustrating reflected signals for an RSA dye doped PS/PEO film before and after exposure to a green pulse train under different operating conditions.
Figure 8B:
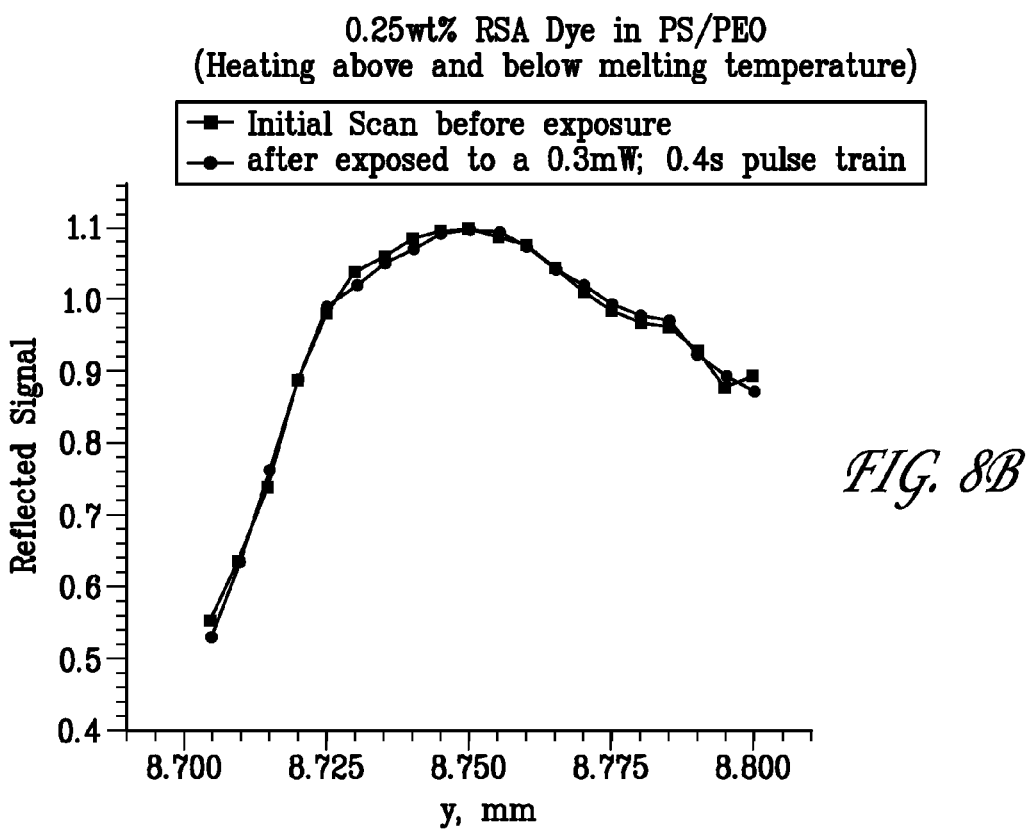

Additional thin film samples that were prepared for Example 8 were subject to freezing at temperatures <−40° C. overnight to crystallize the PEO phase as in earlier examples. Using the same method as in Example 7 and 8, and tested under the same exposure condition of 0.7 mW at 1.5 KHz repetition rate for 0.4 s, changes signifying a RI change were measured from the reflected signals before and after the exposure as shown in the FIG. 8*a*. Reducing the exposure dose to 0.3 mW at the same repetition rate for the same time duration, no changes in RI were measured (shown in FIG. 8*b*) and therefore threshold behavior.

Example 10

A thick substrate of PS/PEO diblock copolymer with Ciba dye showing reverse saturable absorption properties at 532 nm is prepared via solvent casting or molding processes. The part thickness is at least 10 micron and the part is annealed and crystallized prior to micro-hologram recording. A pulsed laser beam output from a laser source (for example a long-coherence length, frequency-doubled, Q-switched, diode-pumped, solid-state Nd:YAG laser producing 1 ns to 10 ns pulses at a repetition rate of 10 kHz) is split into two beams of equal powers (using for example a half-wave plate and polarizing beam-splitter or a 50% reflectivity coated dielectric mirror) and identical polarization states. Mirrors are used to steer the beams into a counter-propagating configuration in which one beam enters the substrate from one side and the other beam enters directly from the opposite side. Lenses are used to focus the beams into the substrate and the beams are aligned such that the focus from both beams completely overlap in 3 dimensions in the sample. As a result of the overlap of the beams, a standing-wave interference pattern is created at the foci that is composed of sinusoidally varying bright and dark intensity regions. The pulse energy of each beam is chosen to be at least 1 nJ/pulse such that the reverse saturable absorber dye absorbs enough of the incident light energy and converts the absorbed light energy into heat. For longer pulses, a higher pulse energy is required. The heat elevates the temperature of the sample in the bright spots above the melt temperature of the PEO domains and supplies energy for the PEO domain to melt from the initial crystalline state into an amorphous state. This crystalline to amorphous transition produces a refractive index change, given as $\Delta n$, that can then be correlated to the diffraction efficiency as:

$$\eta = \left(\frac{\pi \Delta n L}{\lambda}\right)^2$$

where L is the length of the micro-hologram and $\lambda$ is the wavelength of the laser, which is 532 nm in this example. For a refractive index change of 0.001 to 0.01 in a hologram of 5 μm length, the diffraction efficiency is approximately 0.001 or 0.1% to 0.1 or 10%. Hologram length and transverse size can also be increased by increasing the energy per pulse. The micro-holograms are then read-out by using pulse energies substantially lower than 1 nJ per pulse so that no part of the material is elevated to temperatures exceeding the melt temperature of the PEO blocks.

The holographic data storage methods and articles described herein above have many advantages, including, providing holographic data storage with enhanced data storage lifetime leading to greater commercial viability of such photochemically active dye based holographic storage media.

In one aspect, Sphere size in block copolymers (BCPs) may be determined by the molecular weight of the block forming the sphere. Thus, monodisperse BCPs based on PEO/PS having Mw's of 11.5 k and 51 k respectively may form spheres that are 18 nm in diameter. A BCP with blocks of 5 k and 25 k respectively may form spheres ~10-12 nm in diameter. If the PEO phase is polydisperse, then spheres of different sizes may form. Having spheres of different sizes may not be deleterious unless it causes differing amounts of crystallinity, which then leads to different changes in refractive index. As shown in FIG. 9, it has been found that the percent crystallinity in sphere-forming BCPs remains relatively constant over an order of magnitude change in the PEO's Mw (see FIG. 9). Thus, more readily available polydisperse BCPs should be useful as a range of sphere sizes may form and have the same crystallinity.

Additionally, it has been found that crystal quality and enhanced crystallization can be achieved by annealing the crystals prior to writing a hologram. Thus, a process can be implemented for crystallization wherein the BCP can be injection molded to produce a disk that has undergone the desired phase separation; the disk is temporarily cooled to at least −40° C. to initiate crystal nucleation; and the disk is annealed at just below the melting point of the spheres to reorder the crystals and produce a higher degree of crystallization which can increase the capacity and sensitivity of the disk. In the case of PEO/PS, the annealing temperature is approximately 45° C.

In accordance with still further aspects of the present invention, there is provided an exemplary embodiment of a block copolymer wherein all the blocks are amorphous and mixed with an RSA dye. The individual blocks forming the copolymer can be any combination, but not limited, of the following polymers: polystyrene, polymethylmethycrylate, polybutadine, polyvinylpyridinde, polydimethysiloxane, polyisoprene, poly vinyl cyclohexane, polymethacrlyc acid, and poly acrylic acid, for example.

In one example a block copolymer, such as polystyrene/poly methyl methacrylate (PS-PMMA) with an RSA dye such as the Ciba dye. The volume fraction of the polystyrene to poly methyl methacrylate in the block copolymer can be anywhere in the range of 0.05 to 0.95, such that the upon phase separation any of the known ordered block copolymer morphologies, including lamellar, spherical, cylindrical, double gyroid, perforated lamellar, etc are formed. A mixture of the block copolymer with the RSA dye containing small concentrations of dyes, such as 0.25 wt %, still allows the formation of the above morphologies upon phase separation.

A solution of the PS-PMMA/Ciba RSA dye in toluene is prepared from which thin or thick films are either spin coated or spin cast. These films are then further annealed in the temperature range of 160° C. to 190° C. to allow for the self-assembly of the block copolymer/dye mixture. A region of one these films with dimensions in the range of 2 to 5 microns is exposed to a pulse of 532 nm laser light. The RSA dye will absorb most of this incident light converting the radiation to heat. Consequently the temperature of the block copolymer/dye system in the exposed region will increase with the respect to the un-exposed surrounding area. If the intensity of the incident laser pulse is such that the temperature of the block copolymer/dye system in the exposed region are elevated above 250° C., an order to disorder phase transition can occur. Therefore in the regions of the films that have been exposed to light a uniform morphology (without any prominent features) is obtained. In these regions of uniform morphology both PS and PMMA are intimately mixed with each other. The exposed regions with uniform morphology exhibit a change in optical behavior, such as refractive index change, compared with the ordered un-exposed regions. Such system can be used for holographic data storage applications.

In accordance with another exemplary embodiment, a block copolymer, such as polystyrene/poly methyl methacrylate (PS-PMMA) with an RSA dye such as the Ciba RSA dye is used. The volume fraction of the polystyrene to poly methyl methacrylate in the block copolymer can be anywhere in the range of 0.05 to 0.95, such that the upon phase separation any of the known ordered block copolymer morphologies, including lamellar, spherical, cylindrical, double gyroid, perforated lamellar, etc are formed. A mixture of the block copolymer with the RSA dye containing small concentrations of dyes, such as 0.25 wt %, still allows the formation of the above morphologies upon phase separation.

A solution of the PS-PMMA/Ciba dye in toluene is prepared from which thin or thick films are either spin coated or spin cast. These films exhibit a uniform featureless morphology, where both the PS and PMMA are intimately mixed. A region of one these films with dimensions in the range of 2 to 5 microns is exposed to a pulse of 532 nm laser light. The RSA dye will absorb most of this incident light converting the radiation to heat. Consequently the temperature of the block copolymer/dye system in the exposed region will increase with the respect to the un-exposed surrounding area. If the intensity of the incident laser pulse is such that the temperature of the block copolymer/dye system in the exposed region are elevated above the glass transition temperature of the PS and PMMA blocks and below 250° C. (preferentially in the range of 150 to 190° C.), then a disorder to order phase transition can occur. Upon this transition or phase separation highly ordered morphologies characteristic of block copolymers are obtained. The exposed regions with an ordered morphology exhibit a change in optical behavior, such as refractive index change, compared with the disordered un-exposed regions. Such system can be used for holographic data storage applications.

In accordance with another exemplary embodiment, a blend of two or more amorphous polymers is mixed with and RSA dye. The blend constituents can be any combination, but not limited, of the following polymers: polystyrene, polymethylmethycrylate, polybutadine, polyvinylpyridinde, polydimethysiloxane, polyisoprene, poly vinyl cyclohexane, polymethacrlyc acid, poly acrylic acid, polycarbonate, ultem, for example. The blends can also be formed by mixing two or more copolymers or homopolymers with copolymers.

In one example, a blend of polystyrene (PS) and polybutadiene (PB) are mixed with an RSA dye such as the Ciba dye. The volume fraction of the polystyrene to polybutadiene can be anywhere in the range of 0.20 to 0.80, such that phase separation of these two polymers can take place in well defined temperature ranges depending on the blend composition. As opposed to the block copolymer example, the observed morphologies upon phase separation do not exhibit any specific order. A mixture of the blend with the RSA dye containing small concentrations of dyes, such as 0.25 wt %, still allows for the phase separation.

A solution of the PS-PB blend/Ciba RSA dye in toluene is prepared from which thin or thick films are either spin coated or spin cast. These films exhibit a uniform featureless morphology, where both the PS and PB are intimately mixed. A region of one these films with dimensions in the range of 2 to 5 microns is exposed to a pulse of 532 nm laser light. The RSA dye will absorb most of this incident light converting the radiation to heat. Consequently the temperature of the PS/PB/dye blend system in the exposed region will increase with the respect to the un-exposed surrounding area. As a consequence of this temperature elevation, phase separation between the two polymers takes place. The Size of the microphase domains will depend on the length of exposure of the polymer blend to the elevated temperature. In polymer blend system, coarsening of the macrophase separated domains with annealing time is usually observed. Since the duration of the laser pulse is very short, small macrophase separated domains with dimensions smaller than the wavelength of light can be observed. The exposed regions with a phase separated ordered morphology exhibit a change in optical behavior, such as refractive index change, compared with the disordered un-exposed regions. Such system can be used for holographic data storage applications.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

The invention claimed is:

1. A method for storing holographic data, said method comprising:
   step (A) providing an optically transparent substrate comprising a polymer composition and a light absorbing chromophore, said polymer composition comprising a continuous phase and a dispersed phase, said dispersed phase comprising non-linear materials and being less than about 200 nm in size; and
   step (B) locally irradiating a volume element of the optically transparent substrate with a holographic interference pattern by activating one or more light absorbing chromophores corresponding to the volume element, wherein the holographic interference pattern has a first wavelength and an intensity both sufficient to cause a phase change in at least a portion of the dispersed phase within the volume element of the substrate to produce within the irradiated volume element refractive index variations corresponding to the holographic interference pattern, thereby producing an optically readable datum corresponding to the volume element.

2. The method according to claim 1, wherein said polymer composition is comprises a thermoplastic.

3. The method according to claim 1, wherein said polymer composition comprises a thermoplastic copolymer.

4. The method according to claim 1, wherein said polymer composition comprises a polyolefin and polyether.

5. The method according to claim 1, wherein said polymer composition comprises a block copolymer comprising polyolefin structural units and polyether structural.

6. The method according to claim 1, wherein said dispersed phase is less than about 40 nm in size.

7. The method according to claim 1, wherein said light absorbing chromophore is a linearly responsive absorber.

8. The method according to claim 1, wherein said light absorbing chromophore is a reverse saturable absorber (RSA chromophore).

9. The method according to claim 1, wherein said first wavelength is in a range from about 300 nm to about 800 nm.

10. The method according to claim 1, wherein said phase change is a change from an amorphous to a crystalline state.

11. The method according to claim 1, wherein said phase change is a change from a crystalline to an amorphous state.

12. The method according to claim 1, wherein the polymer composition comprises at least one copolymer selected from the group consisting of polystyrene/polybutadiene, polystyrene/polyethylene, poly(ethylene oxide)/poly(t-butyl methacrylate), poly(ethylene oxide)/poly(methyl methacrylate), poly(ethylene oxide)/polystyrene/poly(ethylene oxide), hydrogenated poly(ethylene)/(styrene-butene) or poly(ethylene)/poly(vinyl cyclohexane), polystyrene/poly(lactic acid), polystyrene/poly(caprolactone), polybutabiene/poly(caprolactone), poly(dimethyl siloxane)/poly(caprolactone), poly(dimethyl siloxane)/Nylon-6 and polycarbonate/polyolefin block copolymers.

13. A method for storing holographic data, said method comprising:
   step (A) providing an optically transparent substrate comprising a block copolymer composition, said block copolymer composition comprising a continuous phase and a dispersed phase, said dispersed phase comprising non-linear materials and being less than about 200 nm in size, and a light absorbing chromophore which is a reverse saturable absorber; and
   step (B) locally irradiating the optically transparent substrate with a holographic interference pattern by activating one or more light absorbing chromophores corresponding to a volume element, wherein the pattern has a first wavelength and an intensity both sufficient to cause a phase change, within the volume element of the substrate, in at least a portion of the dispersed phase, and producing within the irradiated volume element refractive index variations corresponding to the holographic interference pattern, thereby producing an optically readable datum corresponding to the volume element.

14. A method for storing data, said method comprising:
   step (A) providing an optically transparent substrate comprising a polymer composition and a light absorbing chromophore, said polymer composition comprising a continuous phase and a dispersed phase, said dispersed phase comprising crystalline material and being less than about 200 nm in size; and
   step (B) locally irradiating a volume element of the optically transparent substrate with a wavelength and an intensity both sufficient to activate the light absorbing chromophore coupled to the volume element to cause a phase change from crystalline to amorphous in at least a portion of the dispersed phase within the volume element of the substrate to produce within the irradiated volume element refractive index variations corresponding to an optically readable datum.

15. A data storage medium having at least one optically readable datum stored therein, the data storage medium comprising:
   a polymer composition and a light absorbing chromophore, said polymer composition comprising a continuous phase and a dispersed phase, said dispersed phase comprising non-linear materials and being less than about 200 nm in size;
   wherein the optically readable datum is stored as a hologram patterned within at least one volume element of an optically transparent substrate.

* * * * *